US012775500B2

(12) United States Patent
Ozawa et al.

(10) Patent No.: US 12,775,500 B2
(45) Date of Patent: Oct. 27, 2026

(54) DATA CENTER MANAGEMENT SYSTEM

(71) Applicant: Hitachi, Ltd., Tokyo (JP)

(72) Inventors: Yoji Ozawa, Tokyo (JP); Satoshi Kaneko, Tokyo (JP); Hiro Tanaka, Tokyo (JP); Yasutaka Kono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 92 days.

(21) Appl. No.: 18/367,369

(22) Filed: Sep. 12, 2023

(65) Prior Publication Data

US 2024/0104478 A1 Mar. 28, 2024

(30) Foreign Application Priority Data

Sep. 26, 2022 (JP) ................................ 2022-152126

(51) Int. Cl.
*G06F 9/50* (2006.01)
*G06Q 10/0637* (2023.01)
*G06Q 50/06* (2024.01)

(52) U.S. Cl.
CPC ............ *G06F 9/5044* (2013.01); *G06F 9/505* (2013.01); *G06Q 10/06375* (2013.01); *G06Q 50/06* (2013.01)

(58) Field of Classification Search
CPC .............. G06Q 10/06375; G06Q 50/06; G06F 9/5044; G06F 9/505
See application file for complete search history.

(56) References Cited

U.S. PATENT DOCUMENTS 8,392,928 B1 3/2013 Forys et al.
9,207,993 B2 12/2015 Jain
2011/0282982 A1 11/2011 Jain
(Continued)

FOREIGN PATENT DOCUMENTS

CN 113394812 A * 9/2021 ............. H02J 3/144

OTHER PUBLICATIONS

Ghamkhari, et al. Energy and Performance Management of Green Data Centers: A Profit Maximization Approach 4 IEEE Transactions on Smart Grid 1017 (Jun. 2013) (Year: 2013).*
(Continued)

*Primary Examiner* — Charles Guiliano
(74) *Attorney, Agent, or Firm* — PROCOPIO, CORY, HARGREAVES & SAVITCH LLP

(57) ABSTRACT

To reduce a power surplus of fluctuating renewable energy. Data center candidate management information indicates a characteristic of renewable energy supplied to each data center candidate. Application program type candidate management information indicates a characteristic of each application program type candidate. The system determines, with reference to the data center candidate management information and the application program type candidate management information, a plurality of combinations each including one or more data center candidates and one or more application program type candidates, determines a score of each combination based on a characteristic of renewable energy supplied to each of the one or more data center candidates and a characteristic of each of the one or more application program type candidates, and selects, based on the score, a combination to be presented.

19 Claims, 20 Drawing Sheets

(56) References Cited

U.S. PATENT DOCUMENTS

2023/0017632 A1* 1/2023 Herb .................. G06F 11/3006
2023/0237398 A1* 7/2023 Reineke ............. G06Q 10/0633
705/7.25

OTHER PUBLICATIONS

Liu, et al. Renewable and Cooling Aware Workload Management for Sustainable Data Centers, Proceedings of the 12th ACM Sigmetrics/Performance joint international conference on Measurement and Modeling of Computer Systems 175 (2012) (Year: 2012).*

Intellectual Property Office of Singapore, Search Report and Written Opinion, Application No. 10202302635Y, dated May 29, 2026, in 9 pages.

* cited by examiner

FIG. 4

| DC INSTALLATION LOCATION CANDIDATE ID (301) | LOCATION (302) | COVERAGE RANGE (303) | CHARACTERISTIC (AVERAGE OR FLUCTUATION OF RENEWABLE ENERGY AMOUNT) (304) | CAPABILITY (305) | FORM (306) | DC COST UNIT PRICE (307) | DC CANDIDATE PRIORITY (308) | ASSUMED PUE (309) |
|---|---|---|---|---|---|---|---|---|
| 1 | POWER DISTRIBUTION SUBSTATION 1 | POWER DISTRIBUTION GRIDS 1, 2, 3 MEGA SOLAR 1 | 0:00 0 kW (±2%)<br>...<br>15:00 200 kW (±30%)<br>...<br>23:00 3 kW (±2%)<br>---<br>FLUCTUATION: LARGE | GPU | CONTAINER DC | 0.1 | 0.8 | 1.3 |
| 2 | POWER DISTRIBUTION SUBSTATION 1 | POWER DISTRIBUTION GRIDS 1, 2, 3 MEGA SOLAR 1 | 0:00 0 kW (±2%)<br>...<br>15:00 200 kW (±30%)<br>...<br>23:00 3 kW (±2%)<br>---<br>FLUCTUATION: LARGE | WITHOUT GPU | CONTAINER DC | 0.1 | 0.8 | 1.3 |
| 3 | POWER DISTRIBUTION SUBSTATION 1 | POWER DISTRIBUTION GRID 1 | 0:00 0 kW (±2%)<br>...<br>15:00 100 kW (±30%)<br>...<br>23:00 3 kW (±2%)<br>---<br>FLUCTUATION: LARGE | GPU | CONTAINER DC | 0.1 | 1.0 | 1.4 |
| 4 | POWER DISTRIBUTION SUBSTATION 21 | POWER DISTRIBUTION GRIDS 21, 22, 23, 24, 25 | 0:00 15 kW (±5%)<br>...<br>15:00 500 kW (±8%)<br>...<br>23:00 3 kW (±2%)<br>---<br>FLUCTUATION: SMALL | GPU | MEDIUM-SCALE DC | 0.2 | 0.6 | 1.3 |
| ... | ... | ... | ... | ... | ... | ... | ... | ... |

DC INSTALLATION LOCATION CANDIDATE TABLE 241

FIG. 5

| APP TYPE ID (321) | APP NAME (322) | FLUCTUATION (CHARACTERISTIC) (323) | CONTROL FLEXIBILITY (CHARACTERISTIC) (324) | DC CAPABILITY RELATED REQUIREMENT (325) | APP POWER CONSUMPTION RATIO (APP POWER CONSUMPTION/ IT EQUIPMENT POWER CONSUMPTION (CAPACITY)) (326) | EXPECTED NUMBER OF USERS (NUMBER OF USERS/kW) (327) | USER UNIT PRICE (328) |
|---|---|---|---|---|---|---|---|
| 1 | DaaS (Desktop as a Service) | SMALL | SMALL | — | 0.5 | 60 | 0.02 MILLION YEN/YEAR |
| 2 | ML (MODEL CREATION) | LARGE | LARGE | GPU | 0.8 | 7.5 | 0.3 MILLION YEN/YEAR |
| : | : | : | | | | | |

APP TYPE TABLE 242

FIG. 6

341 342 343 344

| PROCESSING ID | EXECUTION DATE AND TIME | INPUT (USER INPUT) | OUTPUT |
|---|---|---|---|
| 1 | 2022/4/1/ 10:00 | MINIMUM RENEWABLE ENERGY AMOUNT TO BE USED: 2000 kWh/DAY<br>DC COST UPPER LIMIT: 500 MILLION YEN<br>USE CASE: INITIAL PLAN | "SELECTED DC INSTALLATION LOCATION AND IT EQUIPMENT CAPACITY TABLE" = ID 1, 2<br>"SELECTED APP TYPE AND EXPECTED AMOUNT TABLE" = ID 1, 2 |
| 2 | 2022/10/1 11:00 | MINIMUM RENEWABLE ENERGY AMOUNT TO BE USED: 3500 kWh/DAY<br>DC COST UPPER LIMIT: 600 MILLION YEN<br>USE CASE: DURING INCREASE OR DECREASE IN NUMBER OF DCs | "SELECTED DC INSTALLATION LOCATION AND IT EQUIPMENT CAPACITY TABLE" ID 3<br>"SELECTED APP TYPE AND EXPECTED AMOUNT TABLE" ID 3 |
| : | : | : | : |

DC AND APP TYPE SELECTION PROCESSING RECORD TABLE 243

FIG. 7

| 351<br>COMBINA-TION ID | 352<br>PROCESS-ING ID | 353<br>APP TYPE ID | 354<br>DC INSTALLATION LOCATION CANDIDATE ID | 355<br>RENEWABLE ENERGY AMOUNT | 356<br>DC COST | 357<br>MATCHING DEGREE | 358<br>INDIVIDUAL SCORE | 359<br>TOTAL SCORE |
|---|---|---|---|---|---|---|---|---|
| 1 | 1 | APP TYPE 1<br>APP TYPE 2 | DC CANDIDATE 1<br>DC CANDIDATE 4 | DC CANDIDATE 1: 2000 kWh/DAY<br>DC CANDIDATE 4: 1000 kWh/DAY<br>----<br>TOTAL: 3000 kWh/DAY (CONDITION OK) | DC CANDIDATE 1: 200 MILLION YEN (= 2000 kWh*0.1)<br>DC CANDIDATE 4: 100 MILLION YEN (= 1000 kWh*0.1)<br>----<br>TOTAL: 300 MILLION YEN (CONDITION OK) | APP TYPE 1-DC CANDIDATE 1: 0.06 (= 0.1*2000/(2000+1000))<br>APP TYPE 1-DC CANDIDATE 4: 0.3 (= 1.0*1000/(2000+1000))<br>APP TYPE 2-DC CANDIDATE 1: 0.3 (= 0.5*2000/(2000+1000))<br>APP TYPE 2-DC CANDIDATE 4: 0.16 (= 0.5*1000/(2000+1000)) | APP TYPE 1-DC CANDIDATE 1: 0.048 (= MATCHING DEGREE 0.06*0.9*1.0 (CAPABILITY)*0.8 (DC CANDIDATE PRIORITY))<br>APP TYPE 1-DC CANDIDATE 4: 0.3 (= 0.3*0.9*1.0*1.0)<br>APP TYPE 2-DC CANDIDATE 1: 0.24 (= 0.3*0.9*1.0*0.8)<br>APP TYPE 2-DC CANDIDATE 4: 0.015 (= 0.16*0.9*1.0*1.0) | 0.6 (= TOTAL 0.6 *1.0 (OVERLAPPING OF DC CANDIDATE COVERAGE RANGE)) |
| 2 | 1 | APP TYPE 2 | DC CANDIDATE 3<br>DC CANDIDATE 4 | DC CANDIDATE 3: 1000 kWh/DAY<br>DC CANDIDATE 4: 1000 kWh/DAY<br>----<br>TOTAL: 2000 kWh/DAY (CONDITION OK) | DC CANDIDATE 3: 100 MILLION YEN (= 1000 kWh*0.1)<br>DC CANDIDATE 4: 100 MILLION YEN (= 1000 kWh*0.1)<br>----<br>TOTAL: 200 MILLION YEN (CONDITION OK) | APP TYPE 2-DC CANDIDATE 3: 0.25 (= 0.5*1000/(1000+1000))<br>APP TYPE 2-DC CANDIDATE 4: 0.25 (= 0.5*1000/(1000+1000)) | APP TYPE 2-DC CANDIDATE 3: 0.225 (= 0.25*0.9* 1.0* 1.0)<br>APP TYPE 2-DC CANDIDATE 4: 0.0225 (= 0.25*0.9* 0.1* 1.0) | 0.24 (= TOTAL 0.24 *1.0 (OVERLAPPING OF DC CANDIDATE COVERAGE RANGE)) |
| 3 | 1 | APP TYPE 1 | DC CANDIDATE 3 | DC CANDIDATE 3: 1000 kWh/DAY<br>----<br>TOTAL: 1000 kWh/DAY (CONDITION NG) | DC CANDIDATE 3: 100 MILLION YEN (= 1000 kWh*0.1)<br>----<br>TOTAL: 100 MILLION YEN (CONDITION OK) | —<br>NOT A TARGET BECAUSE OF RENEWABLE ENERGY AMOUNT CONDITION NG | — | — |
| | | | | | | | | |

DC AND APP TYPE SELECTION PROCESSING IN-PROGRESS INFORMATION TABLE 244

FIG. 8

371 372 373 374 375

| ID | APP TYPE CHARACTERISTIC | | DC CHARACTERISTIC | MATCHING DEGREE CALCULATION COEFFICIENT |
|---|---|---|---|---|
| | FLUCTUATION | CONTROL FLEXIBILITY | FLUCTUATION | |
| 1 | SMALL | SMALL | SMALL | 1.0 |
| 2 | SMALL | SMALL | LARGE | 0.1 |
| 3 | SMALL | LARGE | SMALL | 1.0 |
| 4 | SMALL | LARGE | LARGE | 1.0 |
| 5 | LARGE | SMALL | SMALL | 0.1 |
| 6 | LARGE | SMALL | LARGE | 0.1 |
| 7 | LARGE | LARGE | SMALL | 0.5 |
| 8 | LARGE | LARGE | LARGE | 0.5 |

MATCHING DEGREE COEFFICIENT TABLE 245

FIG. 9

381 382 383 384

| ID | ITEM | APPLICATION METHOD (CALCULATION FORMULA) | TARGET (COMBINATION OF INDIVIDUAL SCORES, TOTAL SCORE) |
|---|---|---|---|
| 1 | CHARACTERISTIC (MATCHING DEGREE) | MATCHING DEGREE*0.9 (VALUE DEFINED BY USER) | INDIVIDUAL SCORE |
| 2 | CAPABILITY | CASE WHERE CAPABILITY OF DC CANDIDATE (ACQUIRED FROM "DC INSTALLATION LOCATION CANDIDATE TABLE") MATCHES CAPABILITY REQUIREMENT OF APP TYPE (ACQUIRED FROM "APP TYPE TABLE"): 1.0 IS MULTIPLIED AS COEFFICIENT<br>NON-MATCHING CASE: 0.1 IS MULTIPLIED AS COEFFICIENT | INDIVIDUAL SCORE |
| 3 | DC CANDIDATE PRIORITY (DEFINED BY USER) | "DC CANDIDATE PRIORITY (DEFINED BY USER)" OF TARGET DC CANDIDATE IN "DC INSTALLATION LOCATION CANDIDATE TABLE" IS MULTIPLIED BY INDIVIDUAL SCORE AS COEFFICIENT | INDIVIDUAL SCORE |
| 4 | OVERLAPPING OF DC CANDIDATE COVERAGE RANGES | CASE WHERE COVERAGE RANGES OF DC CANDIDATES OVERLAP EACH OTHER: 0.3 IS MULTIPLIED BY TOTAL SCORE AS COEFFICIENT<br>NON-OVERLAPPING CASE: 1.0 IS MULTIPLIED BY TOTAL SCORE AS COEFFICIENT | TOTAL SCORE |
| : | : | | |

SCORE CALCULATION CONSIDERATION ITEM TABLE 246

FIG. 10

| ID (391) | DC ID (392) | UPDATE DATE AND TIME (393) | STATE (394) | IT EQUIPMENT CAPACITY (395) |
|---|---|---|---|---|
| 1 | 1 | 2022/4/1 | BEING OPERATED | 200 kW (= MAXIMUM RENEWABLE ENERGY 200 kW*(1 + FLUCTUATION 0.3)*PUE 1.3) |
| 2 | 4 | 2022/4/1 | BEING OPERATED | 70 kWh (= MAXIMUM RENEWABLE ENERGY 100 kW*(1 + FLUCTUATION 0.05)*PUE 1.5) |
| 3 | 5 | 2022/10/1 | BEING INSTALLED | 2000 kWh |
| : | : | : | | : |

SELECTED DC INSTALLATION LOCATION AND IT EQUIPMENT CAPACITY TABLE 247

FIG. 11

| ID (401) | APP TYPE ID (402) | UPDATE DATE AND TIME (403) | STATE (404) | EXPECTED AMOUNT (POWER CONSUMPTION) (405) | EXPECTED APP PROFIT (406) |
|---|---|---|---|---|---|
| 1 | 1 | 2022/4/1 | BEING OPERATED | 135 kW (= IT EQUIPMENT CAPACITY OF DC1 200 kW*APP POWER CONSUMPTION RATIO 0.5 + IT EQUIPMENT CAPACITY of DC4 70 kW*APP POWER CONSUMPTION RATIO 0.5) | 162 MILLION YEN/YEAR (= EXPECTED AMOUNT 135 kW*CONVERSION OF EXPECTED NUMBER OF USERS 60*USER UNIT PRICE 0.02) |
| 2 | 2 | 2022/4/1 | BEING CONSTRUCTED | 216 kW (= IT EQUIPMENT CAPACITY OF DC1 200 kW*APP POWER CONSUMPTION RATIO 0.8 + IT EQUIPMENT CAPACITY OF DC4 70 kW*APP POWER CONSUMPTION RATIO 0.8) | 486 MILLION YEN/YEAR (= EXPECTED AMOUNT 216 kW*CONVERSION OF EXPECTED NUMBER OF USERS 7.5*USER UNIT PRICE 0.3) |
| 3 | 2 | 2022/10/1 | BEING CONSTRUCTED | 300 kW | 675 MILLION YEN/YEAR |
| : | : | | | : | |

SELECTED APP TYPE AND EXPECTED AMOUNT TABLE 248

FIG. 12

| ID (411) | DC ID (412) | TIME (413) | RENEWABLE ENERGY PREDICTION AMOUNT (414) |
|---|---|---|---|
| 1 | 1 | 2022/4/3 10:00-11:00 | 80kWh |
| 2 | 1 | 2022/4/3 11:00-12:00 | 100kWh |
| : | : | : | |
| 11 | 2 | 2022/4/3 10:00-11:00 | 90kWh |
| : | : | : | |

RENEWABLE ENERGY AMOUNT PREDICTION TABLE 281

FIG. 13

| APP ID (421) | APP NAME (422) | APP TYPE ID (423) | USER (424) |
|---|---|---|---|
| 11 | DaaS | 1 | USER A |
| 21 | ML | 2 | USER B |
| : | | : | : |

APP TABLE 282

FIG. 14

| APP WL DEPLOYMENT RECORD ID (431) | DEPLOYMENT DATE AND TIME (432) | APP ID (433) | STATE (434) | DEPLOYMENT DESTINATION DC ID (435) | POWER CONSUMPTION (436) |
|---|---|---|---|---|---|
| 1 | 2022/4/3 10:00:00 | 11 | END | 1 | 1kWh |
| 2 | 2022/4/3 11:00:00 | 21 | END | 3 | 1kWh |
| : | : | : | | | |

APP WL DEPLOYMENT RECORD TABLE 283

FIG. 15

| RENEWABLE ENERGY AMOUNT RECORD ID (441) | DC ID (442) | TIME (443) | RENEWABLE ENERGY AMOUNT (444) |
|---|---|---|---|
| 1 | 1 | 2022/4/3 10:00-11:00 | 100kWh |
| 2 | 1 | 2022/4/3 11:00-12:00 | 110kWh |
| : | | | : |

RENEWABLE ENERGY AMOUNT RECORD TABLE 284

FIG. 21

510

SELECT CANDIDATES

APP TYPE CANDIDATE

511

| APP TYPE ID | APP NAME | FLUCTUATION | CONTROL FLEXIBILITY |
|---|---|---|---|
| 1 | DaaS (Desktop as a Service) | SMALL | SMALL |
| 2 | ML (MODEL CREATION) | LARGE | LARGE |
| : | : | : | |

DC INSTALLATION LOCATION CANDIDATE

512

| DC CANDIDATE ID | LOCATION | COVERAGE RANGE | CHARACTERISTIC (RENEWABLE ENERGY AMOUNT, FLUCTUATION) |
|---|---|---|---|
| 1 | POWER DISTRIBUTION SUBSTATION 1 | POWER DISTRIBUTION GRIDS 1, 2, 3 MEGA SOLAR 1 | 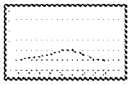 |
| 2 | POWER DISTRIBUTION SUBSTATION 1 | POWER DISTRIBUTION GRIDS 1, 2, 3 MEGA SOLAR 1 | 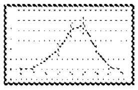 |
| : | : | : | |

513

INPUT PARAMETERS

MINIMUM RENEWABLE ENERGY AMOUNT TO BE USED: [ ]

DC COST UPPER LIMIT: [ ]

CREATE PLAN

514

DC AND APP TYPE PLAN CREATION

FIG. 22

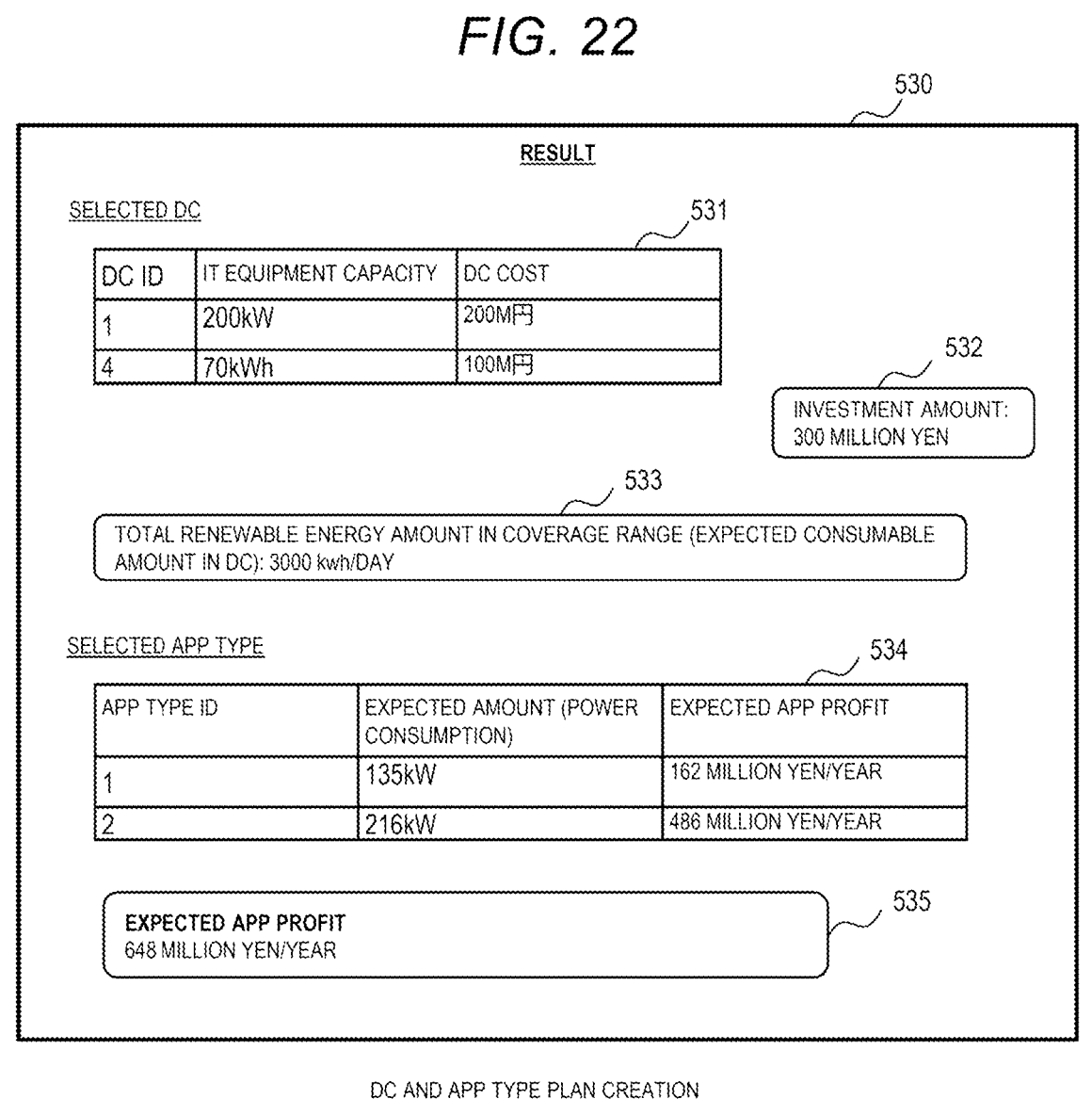

530

RESULT

SELECTED DC

531

| DC ID | IT EQUIPMENT CAPACITY | DC COST |
|---|---|---|
| 1 | 200kW | 200M円 |
| 4 | 70kWh | 100M円 |

532

INVESTMENT AMOUNT: 300 MILLION YEN

533

TOTAL RENEWABLE ENERGY AMOUNT IN COVERAGE RANGE (EXPECTED CONSUMABLE AMOUNT IN DC): 3000 kwh/DAY

SELECTED APP TYPE

534

| APP TYPE ID | EXPECTED AMOUNT (POWER CONSUMPTION) | EXPECTED APP PROFIT |
|---|---|---|
| 1 | 135kW | 162 MILLION YEN/YEAR |
| 2 | 216kW | 486 MILLION YEN/YEAR |

535

EXPECTED APP PROFIT
648 MILLION YEN/YEAR

DC AND APP TYPE PLAN CREATION

DATA CENTER MANAGEMENT SYSTEM

CLAIM OF PRIORITY

The present application claims priority from Japanese patent application JP 2022-152126 filed on Sep. 26, 2022, the content of which is hereby incorporated by reference into this application.

BACKGROUND OF THE INVENTION

1. Field of the Invention

The present invention relates to management of a data center.

2. Description of Related Art

The related art of the invention is U.S. Pat. No. 9,207,993. An optimization framework of a hosting site disclosed in U.S. Pat. No. 9,207,993 dynamically arranges application instances extending over a plurality of hosting sites based on energy cost and availability of these sites, an application service level contract, cost of network bandwidth between the sites, and the like (for example, see abstract).

The framework dynamically determines, by utilizing a global network of a hosting site, and by using renewable energy and non-renewable energy in combination, an optimum data center (site) suitable for arrangement of an application instance that processes a work load input at a certain time point. The application instance can be moved between data centers according to the availability of energy and a dynamic electricity price (which fluctuates in units of several minutes in the real time market, for example, every hour in the previous day's market).

CITATION LIST

Patent Literature

PTL 1: U.S. Pat. No. 9,207,993

SUMMARY OF THE INVENTION

Decarburization in a data center is required. On the other hand, it is required to efficiently use the renewable energy without waste in a region close to a power generation site of the renewable energy as much as possible in accordance with an increase in a power generation amount of the renewable energy. Accordingly, there is a demand for a technique for reducing a surplus of the renewable energy in response to a fluctuation in a renewable energy amount.

According to one aspect of the invention, there is provided a data center management system including: an arithmetic device; and a storage device, in which the storage device stores data center candidate management information and application program type candidate management information, the data center candidate management information is used for managing information on a plurality of data center candidates, information on each data center candidate of the plurality of data center candidates indicates a characteristic of renewable energy supplied to each data center candidate, the application program type candidate management information is used for managing information on a plurality of application program type candidates, information on each application program type candidate of the plurality of application program type candidates indicates a characteristic of each application program type candidate, and the arithmetic device determines, with reference to the data center candidate management information and the application program type candidate management information, a plurality of combinations each including one or more data center candidates and one or more application program type candidates, determines, with reference to the data center candidate management information and the application program type candidate management information, a score of each combination of the plurality of combinations based on the characteristic of renewable energy supplied to each of the one or more data center candidates and the characteristic of each of the one or more application program type candidates, and selects, based on the score, a combination to be presented from the plurality of combinations.

According to one aspect of the invention, a surplus of a renewable energy amount that fluctuates in a region can be reduced.

BRIEF DESCRIPTION OF THE DRAWINGS

FIG. 4 shows a configuration example of a DC installation location candidate table;

FIG. 5 shows a configuration example of an app type table;

FIG. 6 shows a configuration example of a DC and app type selection processing record table;

FIG. 7 shows a configuration example of a DC and app type selection processing in-progress information table;

FIG. 8 shows a configuration example of a matching degree coefficient table;

FIG. 9 shows a configuration example of a score-calculation-considered item table;

FIG. 10 shows a configuration example of a selected DC installation location and IT equipment capacity table;

FIG. 11 shows a configuration example of a selected app type and expected amount table;

FIG. 12 shows a configuration example of a renewable energy amount prediction table;

FIG. 13 shows a configuration example of an app table;

FIG. 14 shows a configuration example of an app WL deployment record table;

FIG. 15 shows a configuration example of a renewable energy amount record table;

FIG. 21 shows an example of a request input screen for an initial plan; and

FIG. 22 shows an example of a planning result display screen of the initial plan.

DESCRIPTION OF EMBODIMENTS

Figure 1:
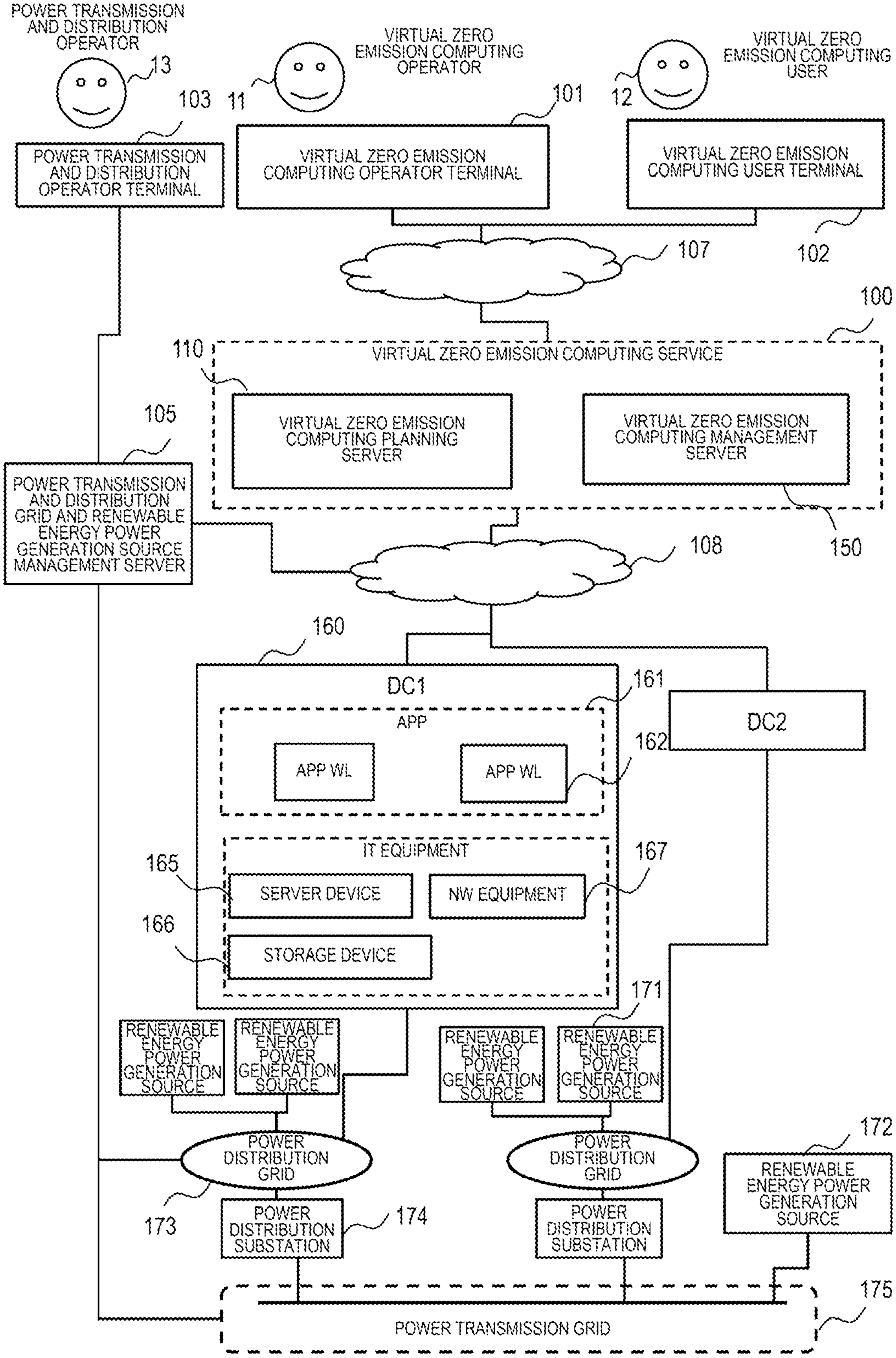
FIG. 1 shows an example of a schematic configuration of a system according to an embodiment of the present specification.

In the following description, when it is necessary for the sake of convenience, the description will be divided into a plurality of sections or embodiments, but unless otherwise specified, the sections or the embodiments are related to each other, and one is related to the other one, that is, one is a modification, a detail, or a supplementary description of some or all of the other one. In addition, in the following description, when referring to the number of elements (including the number, a numerical value, an amount, a range, and the like), the number of elements is not limited to a specific number, and may be equal to or more than a specific number or equal to or less than the specific number, unless otherwise specified and unless clearly limited to a specific number in principle.

A system or device in the present specification may be a physical computer system (one or more physical computers) or a system constructed on a computational resource group (a plurality of computational resources) such as a structure of cloud computing. The computer system or the computational resource group may include one or more interface devices (including a communication device and an input/output device, for example), one or more storage devices (including a memory (main storage) and an auxiliary storage device, for example), and one or more arithmetic devices.

When a program is executed by the arithmetic device to implement a function, the predetermined processing is performed using the storage device and/or the interface device as appropriate. Therefore, the function may be at least a part of one or more arithmetic devices. The processing described with the function as the subject may be processing performed by a system including one or more arithmetic devices.

The program may be installed from a program source. The program source may be, for example, a program distribution computer or a computer-readable storage medium (for example, a computer-readable non-transitory storage medium). The description of each function is an example, and a plurality of functions may be integrated into one function, or one function may be divided into a plurality of functions.

In an embodiment of the present specification, an IT infrastructure plan for providing an application service is created and presented to a user. The IT infrastructure plan shows combinations of one or more data center candidates and one or more application program type candidates. The plan includes information on an installation location of the data center candidate.

In general, a use efficiency of renewable energy of an urban data center is low. In addition, in accordance with an increase in a power generation amount of the renewable energy, it is required to efficiently use the renewable energy without waste and to reduce the load on an electric power system. Therefore, for example, it is conceivable to install a small-sized data center in a vicinity of a renewable power generation source in a local region, and to perform decarburization in the data center by way of local production for local consumption of the renewable energy. In an embodiment of the present specification, the IT infrastructure plan is created and presented under such a request, so that a load of a power system can be reduced and decarburization in a data center can be implemented.

FIG. 1 shows an example of a schematic configuration of a system according to an embodiment of the present specification. The system includes a plurality of data centers (DCs) 160. In FIG. 1, as an example, only one data center (DC1) is indicated by a reference sign 160. The data center 160 includes a plurality of pieces of IT equipment including a server device 165, a storage device 166, and network (NW) equipment. The server device 165 executes one or more deployed application programs (apps) 161. The data center 160 includes an execution environment (not shown) of the app 161.

Each app 161 provides a specific service such as a machine learning service to a user in a virtual desktop service. Each app 161 executes a workload (app workload (WL)) 162, which is assigned processing. Each app 161 sequentially executes the assigned app workload.

The data center 160 includes, in addition to the IT equipment, equipment necessary for functioning as a data center, such as air-conditioning equipment. In the data center 160, in addition to the IT equipment, equipment for the IT equipment consumes power. In the embodiment of the present specification, various forms can be employed for the data center 160. For example, the data center 160 may be a container-type data center, or a data center of a specific scale (for example, a small scale or a medium scale), or a form of mediating a service from the data center to the user (DC in DC) may be employed. The container-type data center may be a portable type or a non-portable type.

The data center 160 is supplied with power from a power distribution grid 173. A plurality of renewable energy power generation sources 171 are connected to the power distribution grid 173 and supply power. A power distribution substation 174 is connected to the power distribution grid 173 and a power transmission grid 175. In FIG. 1, as an example, one power distribution grid is indicated by a reference sign 173, one renewable energy power generation source is indicated by a reference sign 171, and one power distribution substation is indicated by a reference sign 174. A renewable energy power generation source 172 having a large-scale output such as a mega solar is directly connected to the power transmission grid 175.

The renewable energy power generation sources 171 and 172 can use any energy. Any type of renewable energy power generation source using solar photovoltaic power generation, wind power generation, biomass power generation, hydroelectric power generation, geothermal power generation, or the like can be used.

A power transmission and distribution grid and renewable energy power generation source management server 105 manages the power transmission and distribution grid and the renewable energy power generation source for supplying power to the data center 160. Specifically, the power transmission and distribution grid and renewable energy power generation source management server 105 manages the renewable energy power generation sources 171 and 172, the power distribution grid 173, the power distribution substation 174, and the power transmission grid 175. A power transmission and distribution operator 13 accesses the power transmission and distribution grid and renewable energy power generation source management server 105 using a power transmission and distribution operator terminal 103. The power transmission and distribution grid and renewable energy power generation source management server 105 is connected to a network 108.

A virtual zero emission computing service 100 is a virtual computing service provided for a virtual zero emission computing user 12 by an app executed by the data center 160. The virtual zero emission computing user 12 uses the virtual zero emission computing service 100 in a virtual zero emission computing user terminal 102.

A virtual zero emission computing planning server 110 and a virtual zero emission computing management server 150 can provide the virtual zero emission computing service 100.

The virtual zero emission computing management server 150 receives a service request from the virtual zero emission computing user terminal 102 via the network 107. The virtual zero emission computing management server 150 assigns an app workload 162 to a specific application 161 of a specific data center 160 via the network 108.

The virtual zero emission computing management server 150 transmits a processing result of the app 161 to the virtual zero emission computing user terminal 102 via the networks 108 and 107. Any type of network can be used as the networks 107 and 108, and examples thereof include a public network such as the Internet, a local area network (LAN), and a wide area network (WAN).

The virtual zero emission computing planning server 110 creates an IT infrastructure construction plan of the virtual zero emission computing service and presents the IT infrastructure construction plan to a virtual zero emission computing operator 11. The IT infrastructure construction plan shows the types of one or more data centers 160 and one or more application programs 161 to be deployed to the one or more data centers 160. Details of the processing of the virtual zero emission computing planning server 110 will be described later.

The virtual zero emission computing operator 11 uses a virtual zero emission computing operator terminal 101 to access the virtual zero emission computing planning server 110 and the virtual zero emission computing management server 150 via the network 107.

Figure 2:
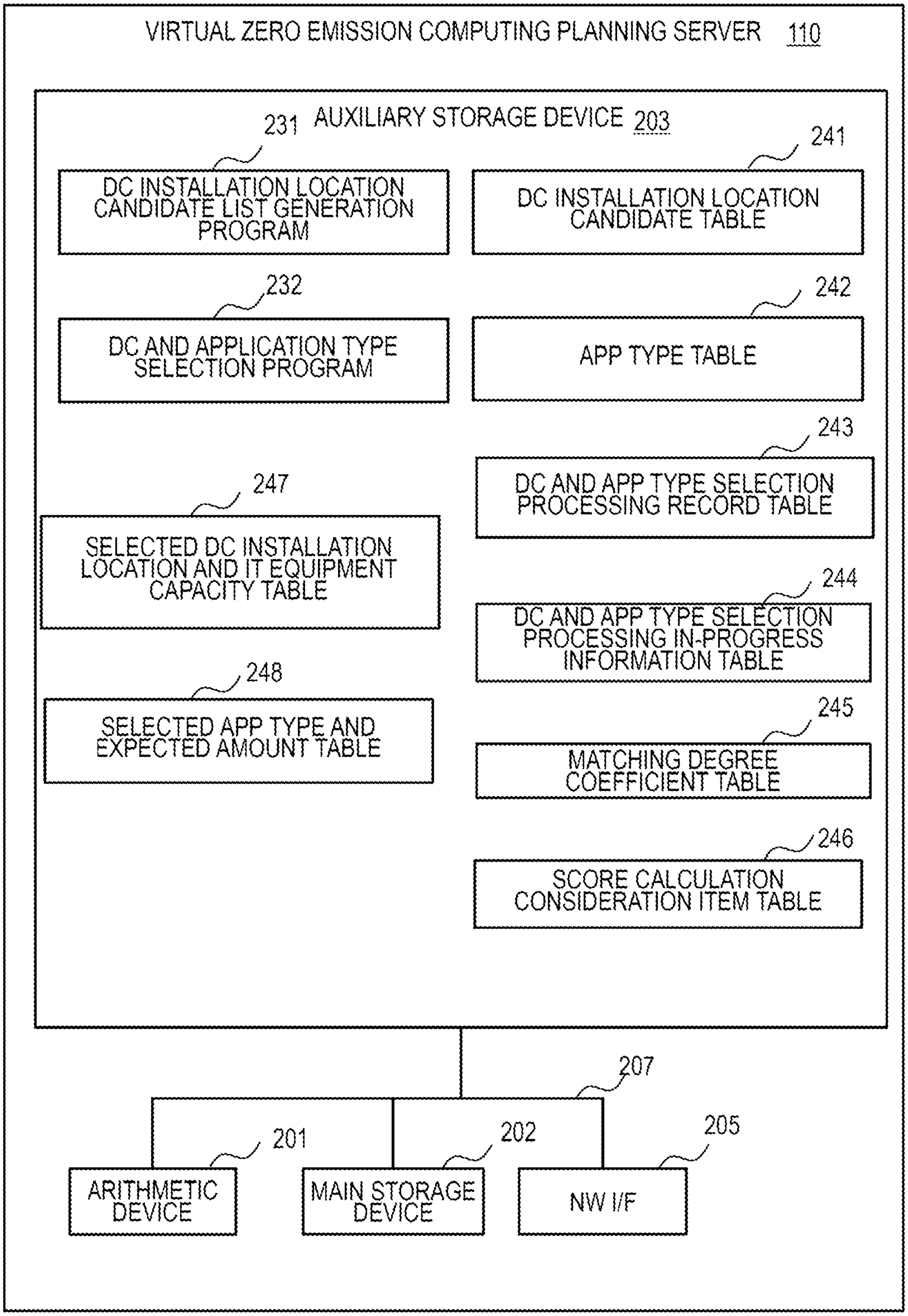
FIG. 2 shows a configuration example of a virtual zero emission computing planning server.

FIG. 2 shows a configuration example of the virtual zero emission computing planning server 110. The virtual zero emission computing planning server 110 includes a main storage device 202 implemented by a volatile storage element such as a RAM, and an auxiliary storage device 203 implemented by an appropriate nonvolatile storage element such as a solid state drive (SSD) or a hard disk drive.

The virtual zero emission computing planning server 110 further includes an arithmetic device 201 such as a CPU that executes a program stored in the auxiliary storage device 203 or the like by reading the program into the main storage device 202, performs overall control of the device itself, and performs various determinations, arithmetic, and control processing.

The virtual zero emission computing planning server 110 includes a network interface 205 for connecting to a network and exchanging data. These components of the virtual zero emission computing planning server 110 can communicate with each other via an internal bus 207. The virtual zero emission computing planning server 110 may further include an input device such as a keyboard, a mouse, and a touch panel that receives an input operation from the user, and an output device such as a display that displays a processing result for the user.

In the auxiliary storage device 203, in addition to programs for the virtual zero emission computing planning server 110 of the present embodiment to implement necessary functions, information necessary for various kinds of processing, and information generated by the programs are stored.

The programs stored in the auxiliary storage device 203 include a DC installation location candidate list generation program 231 and a DC and app type selection program 232. The DC installation location candidate list generation program 231 generates a list of candidates for a location where the data center is installed. The DC and app type selection program 232 selects a data center group and an app type group constituting an IT infrastructure that provides a service. Details of the processing of the programs 231 and 232 will be described later.

The information stored in the auxiliary storage device 203 includes a DC installation location candidate table 241, an app type table 242, a DC and app type selection processing record table 243, a DC and app type selection processing in-progress information table 244, a matching degree coefficient table 245, a score-calculation-considered item table 246, a selected DC installation location and IT equipment capacity table 247, and a selected app type and expected amount table 248. Details of the processing performed by these programs and the tables will be described later.

The functional units of the virtual zero emission computing planning server 110 may be implemented by, for example, the arithmetic device 210 operating in accordance with a predetermined program together with other hardware components.

Figure 3:
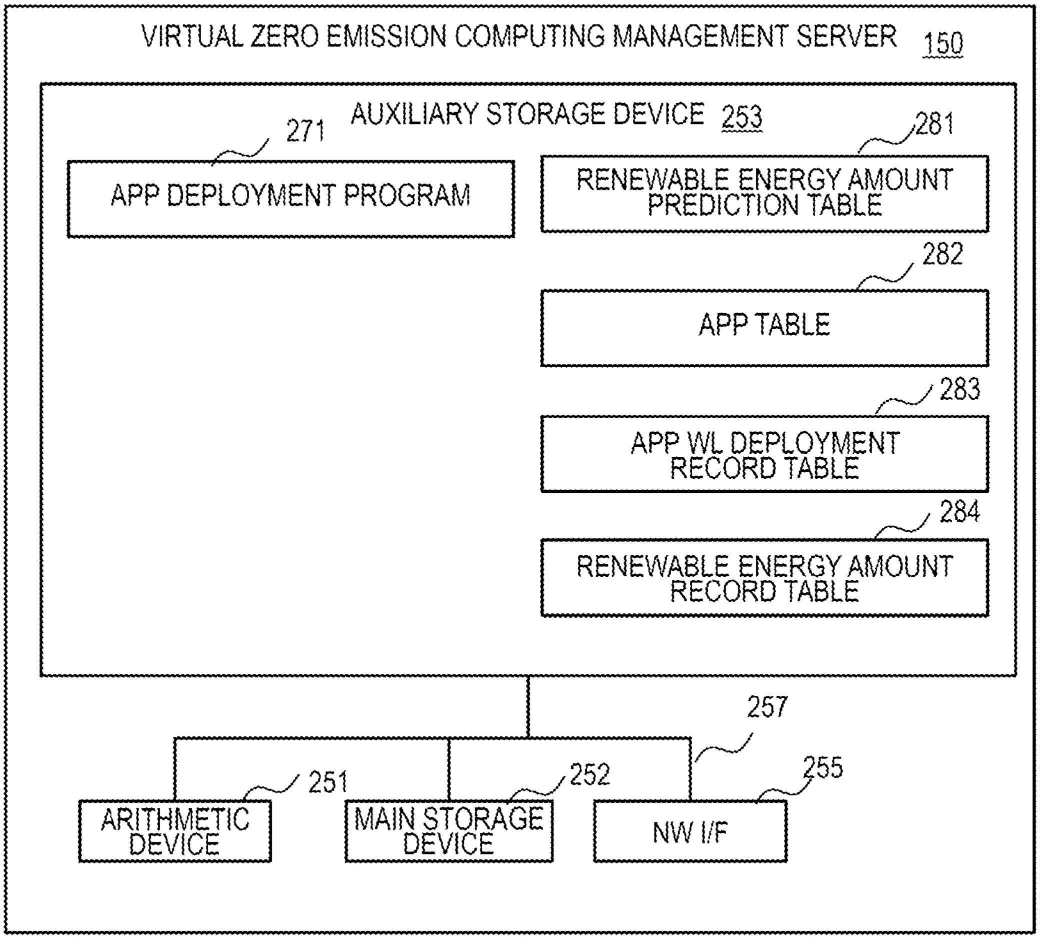
FIG. 3 shows a configuration example of a virtual zero emission computing management server.

FIG. 3 shows a configuration example of the virtual zero emission computing management server 150. The virtual zero emission computing management server 150 includes a main storage device 252 implemented by a volatile storage element such as a RAM, and an auxiliary storage device 253 implemented by an appropriate nonvolatile storage element such as an SSD and a hard disk drive.

The virtual zero emission computing management server 150 further includes an arithmetic device 251 such as a CPU that executes a program stored in the auxiliary storage device 253 or the like by reading the program into the main storage device 252, performs overall control of the device itself, and performs various determinations, arithmetic, and control processing.

The virtual zero emission computing management server 150 includes a network interface 255 for connecting to a network and exchanging data. These components of the virtual zero emission computing management server 150 can communicate with each other via an internal bus 257. The virtual zero emission computing management server 150 may further include an input device such as a keyboard, a mouse, and a touch panel that receives an input operation from the user, and an output device such as a display that displays a processing result for the user.

In the auxiliary storage device 253, in addition to programs for the virtual zero emission computing management server 150 of the present embodiment to implement necessary functions, information necessary for various kinds of processing, and information generated by the programs are stored.

The programs stored in the auxiliary storage device 253 include an app deployment program 271. The information stored in the auxiliary storage device 253 includes a renewable energy amount prediction table 281, an app table 282, an app WL deployment record table 283, and a renewable energy amount record table 284. Details of the processing performed by these programs and the tables will be described later.

The functional units of the virtual zero emission computing management server 150 may be implemented by, for example, the arithmetic device 251 operating in accordance with a predetermined program together with other hardware components.

The virtual zero emission computing planning server 110 and the virtual zero emission computing management server 150 may be a physical computer system (one or more physical computers) or a system constructed on a computational resource group (a plurality of computational resources) such as a cloud infrastructure. The computer system or the computational resource group includes one or more interface devices, one or more storage devices (including, for example, a main storage device and an auxiliary storage device), and one or more arithmetic devices.

When a program is executed by an arithmetic device to implement a function, predetermined processing is performed using a storage device and/or an interface device or the like as appropriate. Therefore, the function may be at least a part of the arithmetic device. The processing described with the function as the subject may be processing performed by an arithmetic device or a system including the processor.

The program may be installed from a program source. The program source may be, for example, a program distribution computer or a computer-readable storage medium (for example, a computer-readable non-transitory storage medium). The description of each function is an example, and a plurality of functions may be integrated into one function, or one function may be divided into a plurality of functions.

The information stored in the virtual zero emission computing management server 150 will be described below. In each table described below, a part of items may be omitted, or other items may be added.

FIG. 4 shows a configuration example of the DC installation location candidate table 241. The DC installation location candidate table 241 shows information on a data center managed by the virtual zero emission computing planning server 110. A data center candidate in the IT infrastructure plan for providing an app service is selected from the DC installation location candidate table 241.

The configuration example shown in FIG. 4 shows information on an installation location (candidate) of a data center and information on a configuration of the data center. The data center may be installed in various locations and may have various configurations. As described later, each record is identified by an installation location candidate ID. The ID is an ID of a managed data center (candidate), that is, an ID for a combination of an installation location and a configuration of the data center.

A data center to be newly installed and a data center that is already installed, which are managed by the virtual zero emission computing management server 150, are to be installed or already installed at an installation location shown by the DC installation location candidate table 241. A part of information of the DC installation location candidate table 241 is preset by a system designer, and a part of information is written by the DC installation location candidate list generation program 231.

In the configuration example shown in FIG. 4, the DC installation location candidate table 241 includes a DC installation location candidate ID column 301, a location column 302, a coverage range column 303, a characteristic column 304, a CAPABILITY column 305, a form column 306, a DC cost unit price column 307, a DC candidate priority column 308, and an assumed PUE column 309. Information in the characteristic column 304 is written by the DC installation location candidate list generation program 231. The other information is preset by the system designer.

The DC installation location candidate ID column 301 shows an ID of an installation location candidate of the data center. In a record showing information on an existing data center, the ID is an ID of an installation location of the existing data center. The ID in the DC installation location candidate ID column 301 is also an ID of a record in the DC installation location candidate table 241. The location column 302 shows a location where a data center is installed. In the example of FIG. 4, the location is indicated by an ID of a power distribution substation that supplies power to a data center.

The coverage range column 303 shows a range of a renewable energy power generation source that supplies power to a data center. In the example of FIG. 4, the coverage range column 303 shows a power distribution grid ID and/or a renewable energy power generation source ID in each record. The power distribution grid ID means all renewable energy power generation sources connected to the power distribution grid.

The characteristic column 304 shows a characteristic of renewable energy supplied from a coverage range to a data center. In this example, the characteristic column shows a time point, a renewable energy amount average, and a renewable energy amount fluctuation on one day. The fluctuation is represented by, for example, a variance. The data center consumes renewable energy to be supplied. A DC installation location and an IT equipment capacity are determined based on the characteristics shown by the characteristic column 304.

The CAPABILITY column 305 shows performance of a data center. In the example of FIG. 4, the CAPABILITY column 305 shows the presence or absence of a GPU implemented in the server device. The performance that can be shown by the CAPABILITY column 305 is not limited thereto.

The form column 306 shows a form of a data center. The form of the data center indicates a scale (for example, a small scale or a medium scale) of a data center of a container type or a normal type other than the container type. The DC cost unit price column 307 shows a cost unit price of a data center. In the example of FIG. 4, a unit of a value shown by the DC cost unit price column 307 is (M yen/DC power consumption amount (kWh/day)).

The DC candidate priority column 308 shows a priority of a data center (installation location). The priority may be omitted. The assumed PUE column 309 shows assumed PUE of a data center. PUE represents power usage efficiency of a data center.

FIG. 5 shows a configuration example of the app type table 242. The app type table 242 is used for managing information on types of application programs that can be deployed to a data center. The app type table 242 is preset in the virtual zero emission computing planning server 110 by the system designer.

The app type table 242 includes an app type ID column 321, an app name column 322, a fluctuation column 323, a control flexibility column 324, a DC CAPABILITY related requirement column 325, an app power consumption ratio column 326, a number of prospective application users column 327, and a user unit price column 328.

The app type ID column 321 shows an ID of an app type. The app name column 322 shows a name of an application program. The fluctuation column 323 shows a level of fluctuation in the number of executions of an application program or a level of fluctuation in a processing amount, that is, a level of fluctuation in a power consumption amount of an application program. In this example, the fluctuation is indicated by two levels, that is, "large" and "small", and the number of levels may be larger.

The control flexibility column 324 shows a level of flexibility with which an execution location and an execution time of an application program can be controlled, that is, a level of flexibility of power consumption amount control performed by an application program. Regarding the control flexibility, workload control of an application program, for example, control of a deployment destination or a deployment time is a main factor. Other factors may be input by the system designer in consideration of scale-in/out of a physical server. In this example, the control flexibility is indicated by two levels, that is, "large" and "small", and the number of levels may be larger.

The DC CAPABILITY related requirement column 325 shows performance required for a data center from an application program. The app power consumption ratio column 326 shows a power consumption ratio of an application program in a data center. In this example, the app power consumption ratio is expressed by "application program power consumption/IT equipment power consumption (capacity)".

The number of prospective application users column 327 shows an expected number of users of an application program. In this example, the number of prospective application users column 327 shows the expected number of users per power consumption, and a unit thereof is "the number of users/kW". The user unit price column 328 shows an income per user obtained by an application program.

As described above, the app type table 242 includes information on characteristics of an application program and a profit. In addition, the fluctuation, the control flexibility, and the power consumption ratio are also characteristics from the viewpoint of power consumption of an application program.

FIG. 6 shows a configuration example of the DC and app type selection processing record table 243. The DC and app type selection processing record table 243 shows a record of a plan proposal of combinations of a data center group and an app type group obtained by the virtual zero emission computing planning server 110.

The DC and app type selection processing record table 243 includes a processing ID column 341, an execution date and time column 342, an INPUT column 343, and an OUTPUT column 344. The processing ID column 341 shows an ID of a record of the DC and app type selection processing record table 243. The execution date and time column 342 shows the date and time when a plan is generated. The INPUT column 343 shows a user input for generating a plan. The OUTPUT column 344 shows a content of a proposed plan. In this example, the record IDs of the selected DC installation location and IT equipment capacity table 247 and the selected app type and expected amount table 248 are shown.

FIG. 7 shows a configuration example of the DC and app type selection processing in-progress information table 244. The DC and app type selection processing in-progress information table 244 stores information generated during plan creation. The DC and app type selection processing in-progress information table 244 is generated by the DC and app type selection program 232.

The DC and app type selection processing in-progress information table 244 includes a combination ID column 351, a processing ID column 352, an app type ID column 353, a DC installation location candidate ID column 354, a renewable energy amount column 355, a DC cost column 356, a matching degree column 357, an individual score column 358, and a total score column 359.

The combination ID column 351 shows an ID of the record in the DC and app type selection processing in-progress information table 244, and shows an ID of a combination of a data center (candidate) group and an app type (candidate) group. The data center group includes one or more data centers, and the app type group includes one or more app types.

The processing ID column 352 shows an ID of processing of one plan creation. The app type ID column 353 shows an app type included in the combination. The DC installation location candidate ID column 354 shows a data center included in the combination. The data center is indicated by a value in the DC installation location candidate ID column of the DC installation location candidate table 241. That is, an installation location of the data center and a configuration (specification) of the data center are specified.

The renewable energy amount column 355 shows an amount of renewable energy supplied to each data center per day. The renewable energy amount column 355 also shows whether a total amount of renewable energy supplied to the data center group satisfies a condition designated by the user. The DC cost column 356 shows an installation cost of each data center. The DC cost column 356 shows whether a total cost of the data center group satisfies a condition designated by the user.

The matching degree column 357 shows a matching degree of each combination of one data center and one app type in the combinations. The matching degree shows the matching degree between the data center and the app type. The larger the value of the matching degree is, the better the data center and the application type match with each other. A method for calculating the matching degree will be described later.

The individual score column 358 shows a score of each combination of one data center and one app type. The higher the individual score is, the more preferable the combination is. A method for calculating the individual score will be described later. The total score column 359 shows a total score, that is, a score of all the combinations of the data center group and the app type group. The total score is calculated from the individual score. The higher the total score is, the more preferable the combination is. A method for calculating the total score will be described later.

FIG. 8 shows a configuration example of the matching degree coefficient table 245. The matching degree coefficient table 245 shows coefficients for calculating the matching degree and is preset by the system designer. The matching degree coefficient is defined for a combination of a characteristic level of an app type and a characteristic level of a data center. The matching degree coefficient table 245 includes an ID column 371, a fluctuation column 372, a control flexibility column 373, a DC characteristic column 374, and a matching calculation coefficient column 375. Based on these items, appropriate values can be defined from the viewpoint of playback characteristics of a data center and power consumption characteristics of an application program. One characteristic of the application program may be omitted.

The ID column 371 shows an ID of a record of the matching degree coefficient table 245. The fluctuation column 372 shows a level of fluctuation in app type characteristics. The fluctuation in the app type characteristics is shown in the fluctuation column 323 of the app type table 242. The control flexibility column 373 shows a level of control flexibility in the app type characteristics. The control flexibility column in the app type characteristic column is shown in the control flexibility column 324 of the app type table 242.

The DC characteristic column 374 shows characteristics of a data center, that is, a level of fluctuation herein. The fluctuation in the data center is shown in the characteristic column 304 of the DC installation location candidate table 241. Here, the levels of the characteristics of the app type and the characteristics of the data center are shown in two stages, that is, "large" and "small", and more levels may be defined. The values in the matching degree calculation coefficient column 375 are changed depending on many levels.

The matching degree calculation coefficient column 375 shows a matching degree coefficient of each record. A larger matching degree coefficient indicates a more appropriate combination. An app having a small fluctuation in the app type and a large control flexibility matches both a data center having a large fluctuation and a data center having a small fluctuation. When the fluctuation in the app type is large, an app having larger control flexibility is more likely to match the data center. When both the fluctuation in the app type and the control flexibility are small, a data center having a smaller fluctuation is more likely to match the app.

FIG. 9 shows a configuration example of the score-calculation-considered item table 246. The score-calculation-considered item table 246 shows items to be considered in calculation of an individual score or a total score described later and a method thereof. The score-calculation-considered item table 246 is preset by the system designer. The individual score is a score for a combination of one data center and one app type in combinations of a data center group and an app type group presented as a plan. The total score is a score for combinations of the data center group and the app type group.

The score-calculation-considered item table 246 includes an ID column 381, an item column 382, an application method column 383, and a target column 384. The ID column 381 shows an ID of a record in the score-calculation-considered item table 246. The item column 382 shows an item to be considered in the score calculation. The application method column 383 shows a method for applying, in the score calculation, the item shown by the item column 382. The target column 384 shows whether an application target of an item is calculation of the individual score or calculation of the total score.

A record with an ID of 1 defines a method for applying the matching degree to the individual score calculation. Specifically, a value obtained by multiplying the calculated matching degree by a preset coefficient 0.9 is used as a coefficient for the individual score calculation.

A record with an ID of 2 defines a method for applying CAPABILITY to the individual score calculation. Specifically, a coefficient is defined according to a match/mismatch between the CAPABILITY of a data center candidate and a CAPABILITY requirement of the app type. A coefficient in the case of matching is larger than a coefficient in the case of non-matching. Accordingly, a combination with a data center more suitable for the app type can be proposed.

In the example shown in FIG. 9, when the CAPABILITY of a data center candidate acquired from the DC installation location candidate table 241 matches the CAPABILITY requirement of an app type acquired from the app type table 242, 1.0 is multiplied as a coefficient. When they do not match, 0.1 is multiplied as a coefficient.

A record with an ID of 3 defines a method for applying the data center priority to the individual score calculation. The priority is multiplied by the individual score as a coefficient so that a score of a data center having a high priority is increased. The priority of the data center is defined in advance in the DC candidate priority column 308 of the DC installation location candidate table 241. Accordingly, a data center having a higher priority can be included in the plan.

A record with an ID of 4 defines a method for applying a relation between renewable energy power generation source ranges of data center candidates to the calculation of the total score. In the example shown in FIG. 9, the record defines coefficients in a case where the renewable energy power generation source ranges of two data center candidates overlap each other (at least partially match) and a case where the ranges do not overlap each other (no matching portion). A coefficient in the case of overlapping is small, and a coefficient in the case of non-overlapping is large. The coefficient is multiplied by the total score. This is because, when there is overlapping, the renewable energy from one renewable energy power generation source is used in a plurality of data centers, and a large amount of renewable energy cannot be used. The above four records are examples. Plural consideration items may be omitted, or other consideration items may be added.

FIG. 10 shows a configuration example of the selected DC installation location and IT equipment capacity table 247. The selected DC installation location and IT equipment capacity table 247 is used for managing information on the IT equipment capacity of a data center (installation location) selected by the DC and app type selection program 232. The IT equipment capacity indicates the power consumption of the IT equipment installed in the data center, and mainly depends on processing performance of the server device 165 installed in the data center, for example, the number of server devices.

The selected DC installation location and IT equipment capacity table 247 includes information on a data center selected in the past plan in addition to a data center selected for a plan being currently processed. The selected DC installation location and IT equipment capacity table 247 is generated and updated by the DC and app type selection program 232.

The selected DC installation location and IT equipment capacity table 247 includes an ID column 391, a DC ID column 392, an update date and time column 393, a state column 394, and an IT equipment capacity column 395.

The ID column 391 shows a record ID of the selected DC installation location and IT equipment capacity table 247. The DC ID column 392 shows an ID of a data center, and a value of the ID is common to the value in the DC installation location candidate ID column 301 of the DC installation location candidate table 241. The update date and time column 393 shows update date and time (creation date and time) of information of a record, and the state column 394 shows a current state of a data center. The IT equipment capacity column 395 shows a value of IT equipment capacity of a data center.

The options of states shown by the state column 394 include, for example, "selected", "being installed", "being operated", and "decommissioned". The term "selected" indicates that a data center is selected as a data center in a plan to be presented. The term "being installed" indicates that the data center in the adopted plan is being installed. The term "being operated" indicates that the data center is being operated for providing a service. The term "decommissioned" indicates that the data center is decommissioned after the installation.

FIG. 11 shows a configuration example of the selected app type and expected amount table 248. The selected app type and expected amount table 248 is used for managing information on expected power consumption and predicted profit of the app type selected by the DC and app type selection program 232. The selected app type and expected amount table 248 includes information on an app type selected in a past plan in addition to an application type selected for a plan currently being processed. The selected app type and expected amount table 248 is generated and updated by the DC and app type selection program 232.

The selected app type and expected amount table 248 includes an ID column 401, an app type ID column 402, an update date and time column 403, a state column 404, an expected amount column 405, and an expected app profit column 406.

The ID column 401 shows a record ID of the selected app type and expected amount table 248. The app type ID column 402 shows an ID of the app type, and a value of the ID is common to the value in the app type ID column 321 of the app type table 242. The update date and time 403 shows date and time when the app type is selected and information on the app type is stored.

The state column 404 shows a current state of an application program of each record. The options of states shown by the state column 404 include, for example, "selected", "being constructed", "being operated", and "decommissioned". The term "selected" indicates that an app type is selected as an app type in a plan to be presented. The term "being constructed" indicates that an application program of the app type in the adopted plan is being constructed. The term "being operated" indicates that the application program is being operated for providing a service. The term "decommissioned" indicates that the application program is decommissioned after the operation.

The expected amount column 405 indicates an expected amount of power consumption of an app type. The expected amount of the power consumption is calculated according to a combination of an app type and a data center. The expected app profit column 406 indicates expected profit of an app type. The expected app profit is calculated based on the expected amount. Details of a method for calculating the expected amount and the expected profit will be described later.

Next, information stored in the virtual zero emission computing management server 150 will be described. FIG. 12 shows a configuration example of the renewable energy amount prediction table 281. The renewable energy amount prediction table 281 is used for managing the prediction of an amount of renewable energy supplied to a data center. The renewable energy amount prediction table 281 includes an ID column 411, a DC ID column 412, a time column 413, and a renewable energy prediction column 414.

The ID column 411 shows a record ID of the renewable energy amount prediction table 281. The DC ID column 412 indicates an ID of a data center to be predicted. The data center ID matches the DC installation location candidate ID. The time column 413 shows predicted time of the renewable energy consumption amount, and the renewable energy prediction column 414 shows a predicted value of the renewable energy supply amount. The predicted value of the renewable energy supply amount can be calculated by a known technique, and for example, can be calculated based on past records and preset information.

FIG. 13 shows a configuration example of the app table 282. The app table 282 is used for managing users of services provided by application programs. The app table 282 includes an app ID column 421, an app name column 422, an app type ID column 423, and a user column 424.

The app ID column 421 shows an ID of an application program, and the app name column 422 shows a name of an application program. The app type ID column 423 shows an ID of a type of an application program, and the user column 424 shows a user who uses a service of an application program.

FIG. 14 shows a configuration example of the app WL deployment record table 283. The app WL deployment record table 283 is used for managing record information on an app workload deployed to a data center. The app workload is deployed by the app deployment program 271.

The app WL deployment record table 283 includes an app WL deployment record ID column 431, a deployment date and time column 432, an app ID column 433, a state column 434, a deployment destination DC ID column 435, and a power consumption column 436.

The app WL deployment record ID column 431 shows a record ID of the app WL deployment record table 283. Each record indicates information on deployment of one app workload. The deployment date and time column 432 shows deployment date and time of an app workload, and the app ID column 433 shows an ID of a deployed application program. The state column 434 shows a state of a deployed app workload.

The deployment destination DC ID column 435 shows a data center as a deployment destination of an app workload. The deployment destination DC ID column 435 shows an ID of the DC installation location candidate ID column 301 of the DC installation location candidate table. The power consumption column 436 shows the power consumption for processing the deployed workload, and the information can be acquired from a data center.

FIG. 15 shows a configuration example of the renewable energy amount record table 284. The renewable energy amount record table 284 is used for managing a record of a power amount of renewable energy supplied to a data center. The renewable energy amount record table 284 includes a renewable energy amount record ID column 441, a DC ID column 442, a time column 443, and a renewable energy amount column 444.

The renewable energy amount record ID column 441 shows a record ID of the renewable energy amount record table 284. The DC ID column 442 shows an ID of a data center to which renewable energy is supplied, and a value of the ID is common to the value in the DC installation location candidate ID column of the DC installation location candidate table 241. The time column 443 shows time when the renewable energy is supplied, and the renewable energy amount column 444 shows a supplied renewable energy amount.

Figure 16:
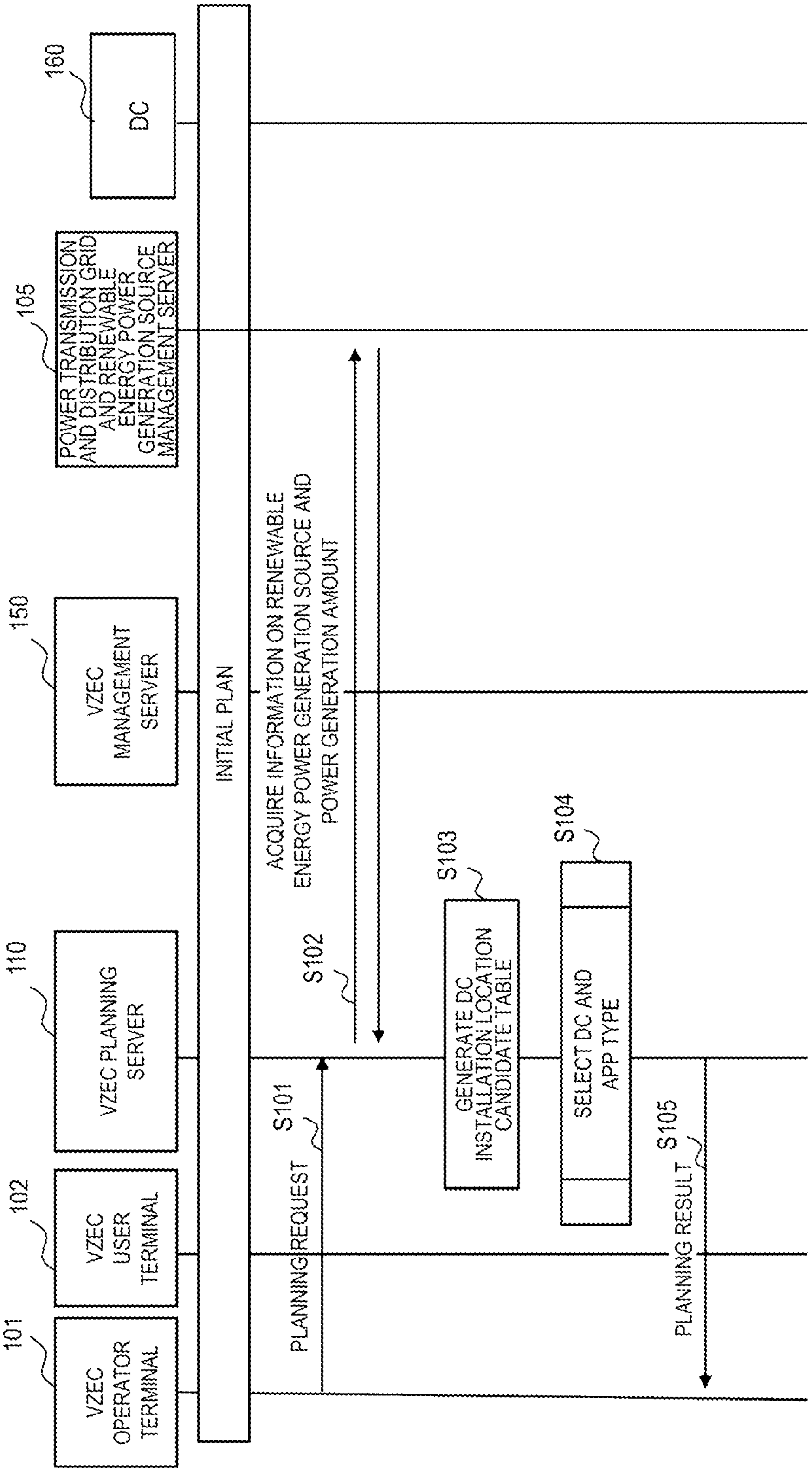
FIG. 16 is a sequence diagram showing an example of processing of creating an initial plan.

FIG. 16 is a sequence diagram showing an example of processing of creating an initial plan. The initial plan proposes a data center group to be newly installed and an app type group to be deployed to the data center group without considering the existing configuration. First, in response to an input from the virtual zero emission computing (VZEC) operator 11, the virtual zero emission computing operator terminal 101 transmits a planning request to the virtual zero emission computing planning server 110 (S101).

When the virtual zero emission computing planning server 110 receives the planning request, the virtual zero emission computing planning server 110 acquires information on a renewable energy power generation source and information on a power generation amount of the renewable energy power generation source from the power transmission and distribution grid and renewable energy power generation source management server 105 (S102).

The virtual zero emission computing planning server 110 uses the acquired information to execute DC installation location candidate table generation processing (S103). Details of the DC installation location candidate table generation processing will be described later with reference to FIG. 17. Characteristic information generated from the acquired information is stored in the characteristic column 304 of the DC installation location candidate table 241.

Next, the virtual zero emission computing planning server 110 executes DC and app type selection processing in response to the planning request (S104). Details of the DC and app type selection processing will be described later with reference to FIGS. 20A, 20B, and 20C. The virtual zero emission computing planning server 110 returns created planning results to the virtual zero emission computing operator terminal 101.

Figure 17:
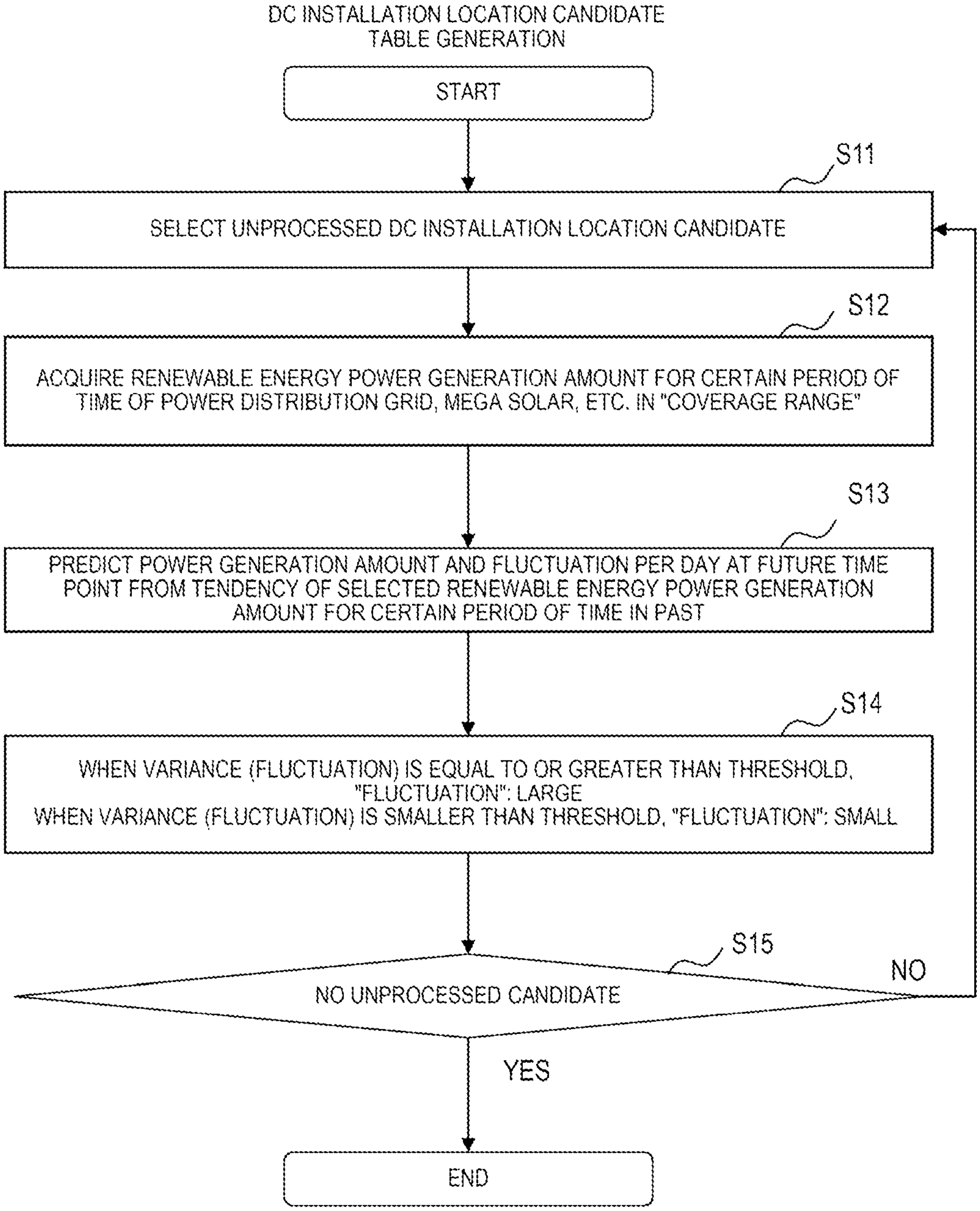
FIG. 17 is a flowchart of an example of processing of generating the DC installation location candidate table.

FIG. 17 is a flowchart of an example of processing of generating the DC installation location candidate table 241. Information other than the characteristic column 304 of the DC installation location candidate table 241 is preset by the system designer. The DC installation location candidate list generation program 231 generates the DC installation location candidate table 241 by inputting information in the characteristic column 304.

The DC installation location candidate list generation program 231 selects a record of an unprocessed DC installation location candidate from the DC installation location candidate table 241 (S11). Next, the DC installation location candidate list generation program 231 acquires a renewable energy power generation amount for a certain period of time of a power distribution grid, a mega solar, or the like indicated by the selected record in the coverage range column 303 (S12). Information on the power generation amount of each of the renewable energy power generation sources is acquired in advance from the power transmission and distribution grid and renewable energy power generation source management server 105. The certain period of time may be, for example, one year.

Next, the DC installation location candidate list generation program 231 predicts a power generation amount and fluctuation per day at a future time point (for example, after one year) from a tendency of the selected renewable energy power generation amount for a certain period of time in the past (S13). The predicted value is acquired from the virtual zero emission computing management server 150 or is calculated according to a preset calculation method. In the prediction, for example, a regression model is created based on the records of the renewable energy power generation amount for a certain period of time in the past, and the power generation amount at the future time point is predicted. The DC installation location candidate list generation program 231 may set a statistical value of the acquired renewable energy power generation amount as a predicted value of the power generation amount and the fluctuation per day. For example, the power generation amount per hour may be an average value in a certain period of time in the past, and the fluctuation amount may be a variance. The DC installation location candidate list generation program 231 stores the calculated predicted value in the characteristic column 304 of the record.

Next, when the predicted value of the fluctuation is equal to or greater than a threshold, the DC installation location candidate list generation program 231 determines that the fluctuation in the renewable energy power generation amount is large. When the predicted value of the fluctuation is smaller than the threshold, it is determined that the fluctuation in the renewable energy power generation amount is small. The threshold may be, for example, 10%. As will be described later, the fluctuation in the renewable energy power generation amount is referred to together with the matching degree coefficient table 245 in order to calculate a combination of an app and a data center. The DC installation location candidate list generation program 231 stores information on the fluctuation in the characteristic column 304 of the record.

Next, the DC installation location candidate list generation program 231 determines whether an unprocessed DC installation location candidate remains. When an unprocessed DC installation location candidate remains (S15: NO), the flow returns to step S11. When the processing is completed for all the DC installation location candidates (S15: YES), the flow ends.

Figure 18:
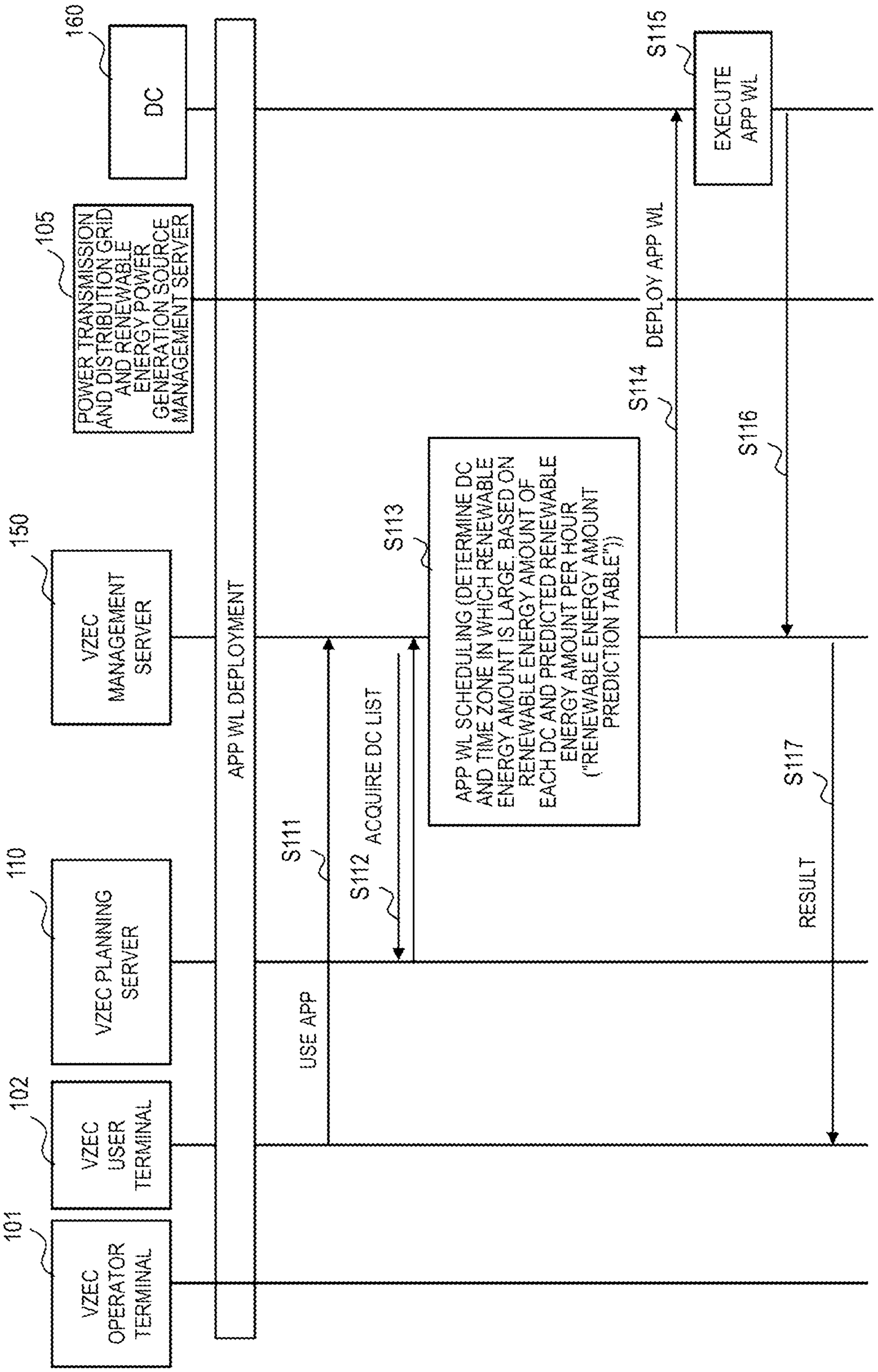
FIG. 18 is a sequence diagram showing an example of processing of deploying an app workload to a data center.

FIG. 18 is a sequence diagram showing an example of processing of deploying an app workload to a data center. First, in response to an input from the virtual zero emission computing user 12, the virtual zero emission computing user terminal 102 transmits a use request for an application program service to the virtual zero emission computing management server 150 (S111).

The virtual zero emission computing management server 150 acquires, from the virtual zero emission computing planning server 110, a list of data centers capable of deploying an app type of the requested app service (S112). For example, a list of data centers can be created from the DC and app type selection processing record table 243.

The app deployment program 271 of the virtual zero emission computing management server 150 performs app workload scheduling (S113). The app deployment program 271 determines, as an execution data center and execution time of the app workload, a data center and a time zone in which a renewable energy supply amount is large, based on the predicted renewable energy amount per hour indicated by the renewable energy amount prediction table 281.

The app deployment program 271 deploys the requested app workload to the data center 160 as the determined deployment destination (S114). The data center 160 executes the deployed app workload (S115), and returns the execution result to the virtual zero emission computing management server 150 (S116). The app deployment program 271 transfers the received execution result to the virtual zero emission computing user terminal 102.

Figure 19:
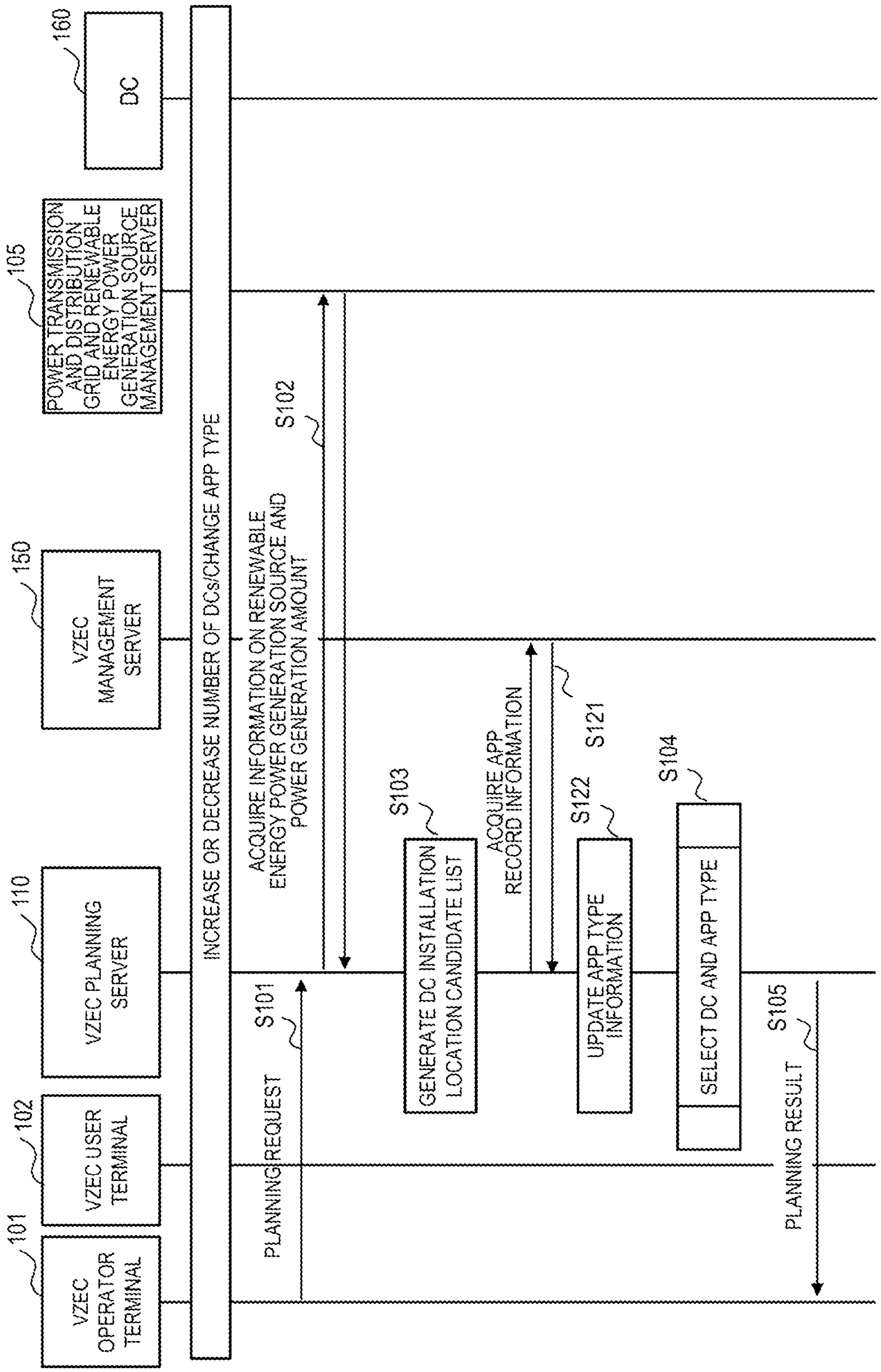
FIG. 19 is a sequence diagram showing an example of processing of creating a plan for increasing or decreasing the number of data centers or changing an app type.

FIG. 19 is a sequence diagram showing an example of processing of creating a plan for increasing or decreasing the number of data centers or changing an app type. The increase or decrease in the number of data centers or the change in the app type is based on the premise of existing data centers.

First, in response to an input from the virtual zero emission computing operator 11, the virtual zero emission computing operator terminal 101 transmits a planning request to the virtual zero emission computing planning server 110 (S101). The request indicates the increase or decrease in the number of data centers or the change in the app type.

When the virtual zero emission computing planning server 110 receives the planning request, the virtual zero emission computing planning server 110 acquires information on a renewable energy power generation source and information on a power generation amount of the renewable energy power generation source from the power transmission and distribution grid and renewable energy power generation source management server 105 (S102).

The virtual zero emission computing planning server 110 uses the acquired information to execute DC installation location candidate table generation processing (S103). Details of the DC installation location candidate table generation processing are described with reference to FIG. 17.

Next, the virtual zero emission computing planning server 110 acquires app record information from the virtual zero emission computing management server 150 (S121). The virtual zero emission computing planning server 110 updates the information in the app type table 242 based on the acquired information (S122), and specifically, updates the fluctuation (characteristic) 323 to "large" when the variation in the power consumption amount in the same time period is large for each app type based on the app WL deployment record table 283. When the variation is small, the fluctuation (characteristic) 323 is updated to "small".

Next, the virtual zero emission computing planning server 110 executes DC and app type selection processing in response to the planning request (S104). Details of the DC and app type selection processing will be described later with reference to FIGS. 20A, 20B, and 20C. The virtual zero emission computing planning server 110 returns created planning results to the virtual zero emission computing operator terminal 101.

Figure 20A:
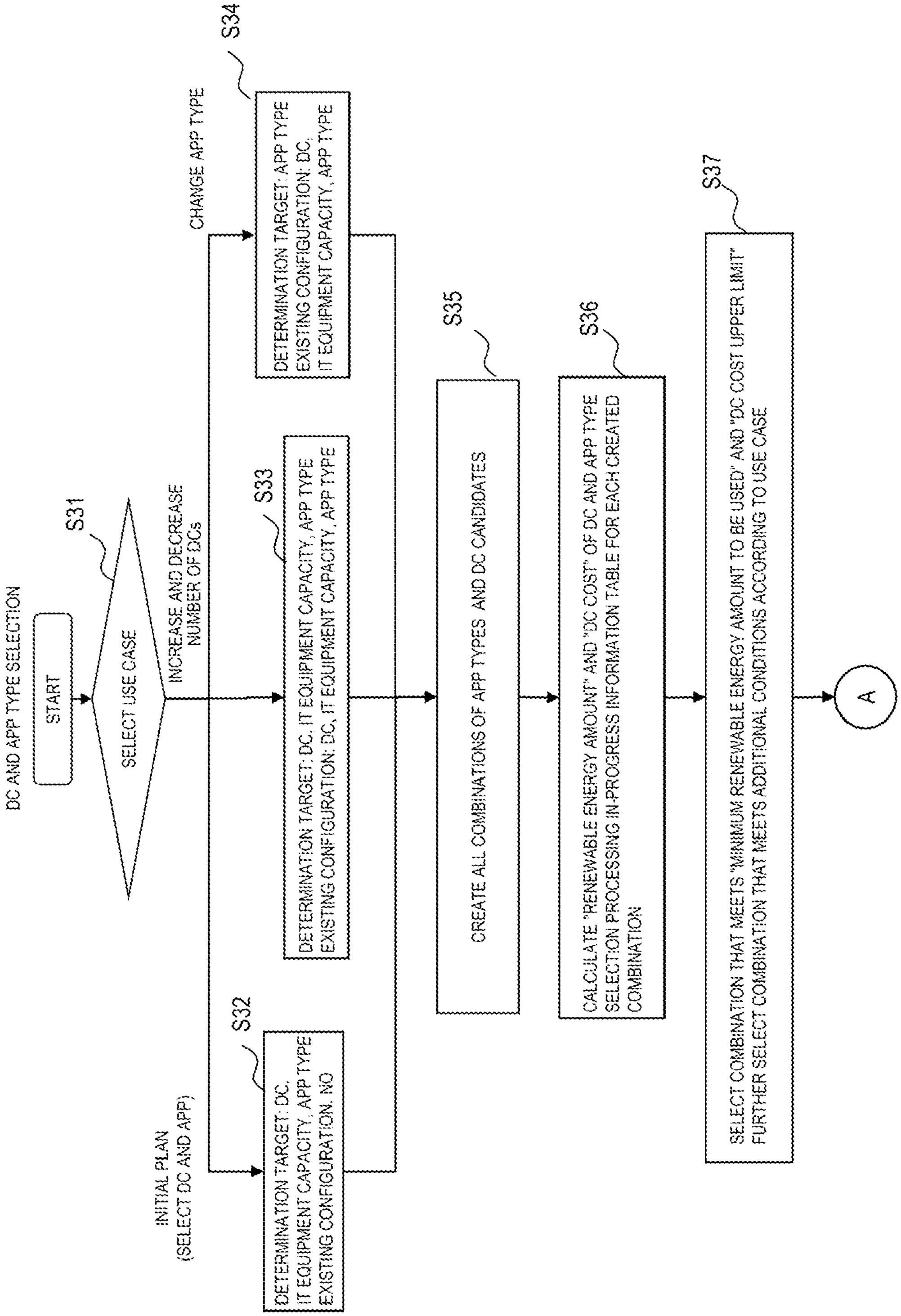
FIG. 20A is a part of a flowchart showing details of DC and app type selection processing.

Hereinafter, the DC and app type selection processing S104 will be described in detail with reference to FIGS. 20A, 20B, and 20C. In the DC and app type selection processing S104, an IT infrastructure construction plan of the virtual zero emission computing service to be presented to the virtual zero emission computing operator 11 is created.

The IT infrastructure construction plan indicates candidates of a combination of a data center group and an app type group deployed in the data center group. The IT infrastructure construction plan presents candidates of a combination of a new data center group and an app type group to be deployed or candidates of an app type group to be deployed to an existing data center according to a use case.

First, the DC and app type selection program 232 selects a use case in response to an input from the virtual zero emission computing operator 11 (S31). When the use case is the initial plan, that is, when both a data center (installation location) and an application program are selected, a determination target is data centers to be installed, IT equipment capacity of the data centers, and types of application programs to be deployed. There is no existing configuration in the use case (S32).

When the use case is the increase or decrease in the number of data centers, the determination target is data centers whose number is to be increased or decreased, the IT equipment capacity of the data centers whose number is to be increased, and types of application programs to be deployed to the data centers after the increase or decrease in the number of data centers. The existing components considered in the use case are data centers, IT equipment capacity of the data centers, and types of application programs deployed in the data centers (S33).

When the use case is a change in types of application programs, the determination target is the types of application programs to be deployed. The existing components are data centers, IT equipment capacity of the data centers, and types of applications deployed in the data centers (S34).

Next, the DC and app type selection program 232 creates all combinations of one or more app program type candidates and one or more data center candidates (S35). Specifically, the DC and app type selection program 232 selects and combines one or more records from each of the DC installation location candidate table 241 and the app type table 242. The DC installation location candidate table 241 also includes a record indicating information on an existing data center, in addition to a data center to be newly installed. Similarly, the app type table 242 also includes a record indicating information on an existing app type, in addition to an app type to be newly deployed. Note that an upper limit may be set for the number of data centers and/or app types in a combination.

The DC and app type selection program 232 respectively stores an app type ID of each app type and a DC installation location candidate ID of each data center of each formed combination in the app type ID column 353 and the DC installation location candidate ID column 354 in the DC and app type selection processing in-progress information table 244. An ID of each record and a common ID indicating current processing are respectively stored in the combination ID column 351 and the processing ID column 352.

Next, the DC and app type selection program 232 calculates a value in the renewable energy amount column 355 and a value in the DC cost column 356 of the DC and app type selection processing in-progress information table 244 for each of the created combinations (S36).

In the calculation of the renewable energy amount, power (for example, an average value) at each time point shown by the characteristic column 304 of the DC installation location candidate table 241 is added to calculate a renewable energy amount in one day (kWh/day). The value is stored in the renewable energy amount column 355 as the renewable energy amount. In the calculation of the DC cost, the above calculated renewable energy amount is multiplied by the value shown by the DC cost unit price column 307 of the DC installation location candidate table 241. The value is stored in the DC cost column 356 as the DC cost.

Next, the DC and app type selection program 232 selects only a record satisfying a predetermined condition from the DC and app type selection processing in-progress information table 244 and leaves the record (S37). First, the DC and app type selection program 232 selects, from the DC and app type selection processing in-progress information table 244, a combination of a data center and an application type for which the renewable energy amount and the DC cost calculated at step S36 satisfy predetermined conditions.

When the minimum renewable energy amount and an upper limit of the DC cost designated in advance by the virtual zero emission computing operator 11 are satisfied, that is, when a value shown by the renewable energy amount column 355 of the DC and app type selection processing in-progress information table 244 is equal to or greater than the designated minimum renewable energy amount to be used, and the value shown by the DC cost column 356 is equal to or smaller than the designated upper limit of the DC cost, the combination (record) satisfies the above conditions. Accordingly, it is possible to present an IT infrastructure plan indicating a combination of a data center and an app type required by the virtual zero emission computing operator 11.

An additional condition is imposed on the selected combination (record) according to the use case. There is no additional condition for the use case of the initial plan. In the case of the use case of increasing the number of data centers, the additional condition is that the combination includes all the existing data centers. That is, a record in which the DC installation location candidate ID column 354 includes all the existing data centers is selected.

In the case of the use case of decreasing the number of the data centers, the additional condition is that all the data centers in the combinations are included in the existing data centers. That is, a record whose DC installation location candidate ID column 354 shows only a part of the existing data centers is selected.

In the case of the use case of changing the app type, the additional condition is that the data center group in the combinations is implemented by the existing data center group. That is, a record in which the data centers in the DC installation location candidate ID column 354 are implemented by all the existing data centers is selected. The app type group in the combination may have no condition, and an additional condition may be imposed. For example, when an app type is further added to the existing app type, combinations including all the existing app types are selected. On the other hand, when plural app types are deleted from the existing app types, a record whose app type ID column 353 shows only the existing app types are selected.

Figure 20B:
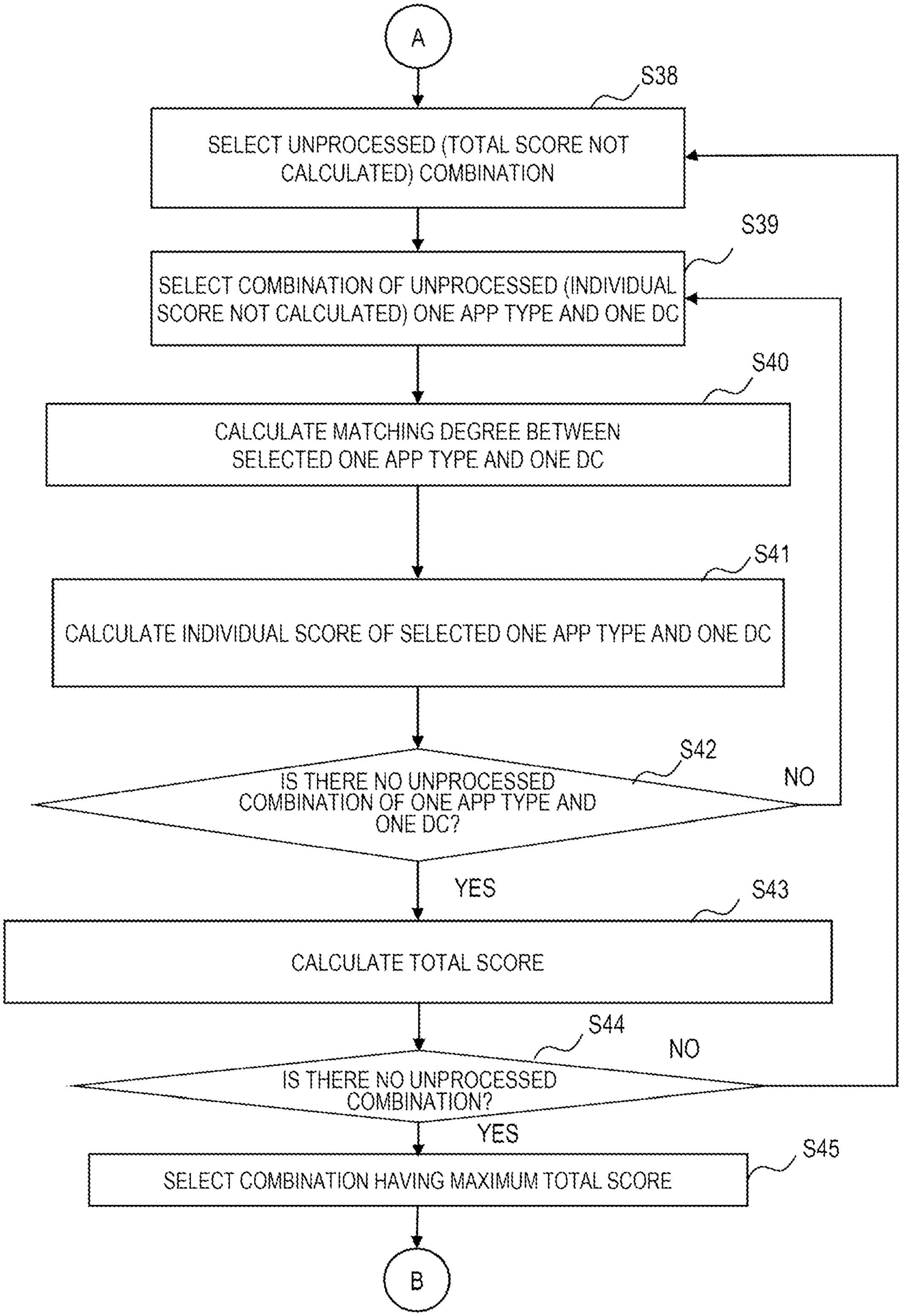
FIG. 20B is a part of the flowchart showing details of the DC and app type selection processing.

Next, the flow proceeds to the steps in FIG. 20B via a connector A. The DC and app type selection program 232 executes steps S38 to S40 for the combinations selected in step S37. The selected combinations are records selected from the DC and app type selection processing in-progress information table 244, and show a data center group including one or more data centers and an app type group including one or more app types.

First, the DC and app type selection program 232 selects, from the combinations selected in step S32, combinations for which a total score is not calculated (S38). The total score will be described later. Next, the DC and app type selection program 232 selects a combination of one app type and one data center for which the individual score is not calculated in the selected combinations (S39).

The DC and app type selection program 232 calculates a matching degree of the selected combination of one app type and one data center, and stores the matching degree in the matching degree column 357 of the DC and application type selection processing information table 244 (S40). In one example, the matching degree may be calculated by the following method.

Matching degree=matching degree coefficient*renewable energy amount of DC/SUM

The matching degree coefficient is acquired from the matching degree coefficient table 245 according to the target app type. SUM is a total renewable energy amount of all data centers of the combinations as a processed target, that is, the combinations selected in step S38.

Next, the DC and app type selection program 232 calculates an individual score of the selected combination of one app type and one data center, and stores the individual score in the individual score column 358 of the DC and app type selection processing in-progress information table 244 (S41). For example, the DC and app type selection program 232 refers to the score-calculation-considered item table 246, and calculates the individual score in accordance with a method shown by the application method column 383 in relation to an item of the item column 382 of the record whose target column 384 shows “individual”. Specifically, the DC and app type selection program 232 multiplies the matching degree by a user-defined coefficient in the case of the characteristic (matching degree).

Next, the DC and app type selection program 232 determines whether the combination of one app type and one data center which is unprocessed, that is, for which the individual score is not calculated remains (S42). When the combination remains (S42: NO), the flow returns to step S39. When the combination does not remain (S42: YES), the DC and app type selection program 232 calculates a total score for the combinations of the data center group and the app type group selected in step S38, and stores the total score in the total score column 359 of the DC and app type selection processing in-progress information table 244 (S43).

The total score is calculated by, for example, the following method. The DC and app type selection program 232 calculates the total of the individual scores. Next, referring to the score-calculation-considered item table 246, the total score is calculated in accordance with the method shown by the application method column 383 in relation to an item in the item column 382 of a record whose target column 384 shows “total score”. In a specific system, the DC and app type selection program 232 multiplies the total of the individual scores by a coefficient of an item for which a value in the target column 384 is “total score”.

Next, the DC and app type selection program 232 determines whether the combinations of a data center group and an app type group which are unprocessed, that is, for which the total score are not calculated remains (S44). When the combinations remain (S44: NO), the flow returns to step S38. When the combinations do not remain (S44: YES), the DC and app type selection program 232 selects a combination having a maximum total score (S45).

Figure 20C:
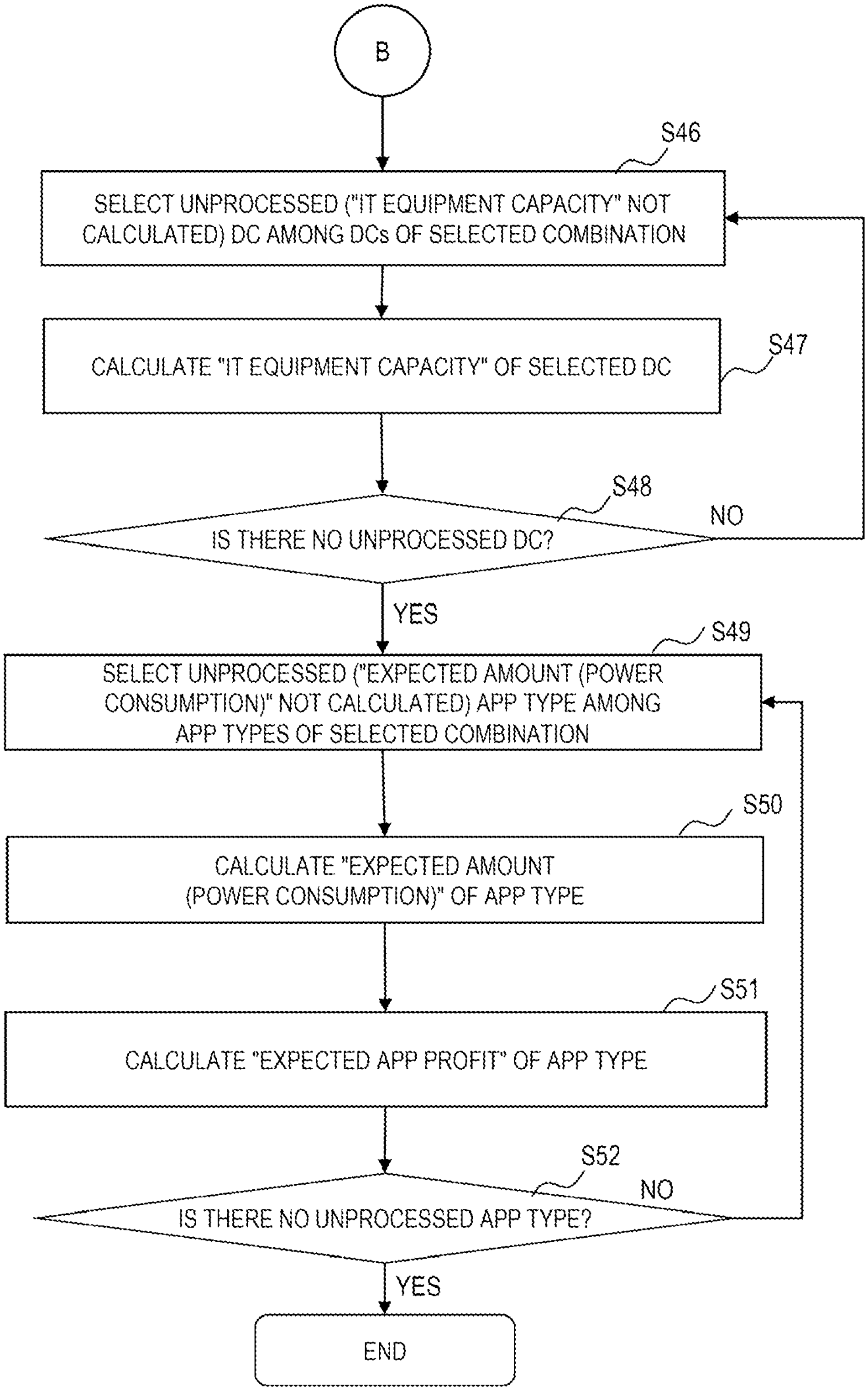
FIG. 20C is a part of the flowchart showing details of the DC and app type selection processing.

Next, the flow proceeds to the steps in FIG. 20C via a connector B. The DC and app type selection program 232 executes steps S46 to S52 for the combination selected in step S45.

First, the DC and app type selection program 232 selects a data center which is unprocessed, that is, for which the IT equipment capacity is not calculated, among the data centers of the combination selected in step S45 (S46).

Next, the DC and app type selection program 232 calculates the IT equipment capacity of the selected data center (S47). The DC and app type selection program 232 stores the calculated IT equipment capacity in the IT equipment capacity column 395 in the selected DC installation location and IT equipment capacity table 247. Information on the record or the selected data center is stored in respective one of the ID column 391, the DC ID column 392, the update date and time column 393, and the state column 394.

For example, the IT equipment capacity may be derived as follows. The DC and app type selection program 232 acquires a maximum value of the renewable energy amount (power) of a target data center from the characteristic column 304 of the DC installation location candidate table 241. The maximum value of a fluctuation amount is acquired from the characteristic column 304 of the DC installation location candidate table 241.

The DC and app type selection program 232 calculates a sum of the maximum value of the renewable energy amount (power) and the maximum value of the fluctuation amount as the maximum renewable energy amount (power) in one day. The DC and app type selection program 232 acquires a value from the assumed PUE column 309, and divides the maximum renewable energy amount by the assumed PUE value to calculate the power consumption of the IT equipment, that is, the IT equipment capacity.

Next, the DC and app type selection program 232 determines whether a data center which is unprocessed, that is, for which the IT equipment capacity is not calculated remains, among the data centers of the combination selected in step S45 (S48). When the unprocessed data center remains (S48: NO), the flow returns to step S46. When the unprocessed data center does not remain (S48: YES), an app type which is unprocessed, that is, for which the expected amount (power consumption) is not calculated is selected from the app types of the selected combination (S49).

The DC and app type selection program 232 calculates an expected amount (power consumption) of the selected app type (S50). The DC and app type selection program 232 stores the calculated value in the expected amount (power consumption) column 405 in the selected app type and expected amount table 248. Information on the record or the selected app type is stored in a respective one of the ID column 401, the app type ID column 402, the update date and time column 403, and the state column 404.

For example, the expected amount (power consumption) of the app type may be calculated as follows. The DC and app type selection program 232 calculates individual expected quantities relating to the target app type, and further sums up the individual expected quantities to determine the expected amount (power consumption) of the target app type.

The individual expected amount is calculated for a combination of the target app type and each data center in the combination of the app type group and the data center group selected in step S45 (a combination of one app type and one data center).

The DC and app type selection program 232 acquires IT equipment capacity of the target data center from the IT equipment capacity column 395 of the selected DC installation location and IT equipment capacity table 247, and acquires an app power consumption ratio of the target app type from the app power consumption ratio column 326 of the app type table 242. The DC and app type selection program 232 determines a value of multiplication of the IT equipment capacity and the app power consumption ratio as the individual expected amount of the combination of the target app type and the target data center.

Next, the DC and app type selection program 232 calculates the expected application profit of the app type and stores the expected app profit in the expected app profit column 406 of the selected app type and expected amount table 248 (S51).

For example, the expected app profit can be calculated as follows. The DC and app type selection program 232 acquires the expected amount (power consumption) of the target app type from the expected amount (power consumption) column 405 of the selected app type and expected amount table 248. The expected number of app users (the number of users/kW) and the user unit price are acquired from the number of prospective application users column 327 and the user unit price column 328 of the app type table 242. The DC and app type selection program 232 multiplies the expected amount (power consumption) by the expected number of app users and the user unit price to calculate the expected app profit.

Next, the DC and app type selection program 232 determines whether an app type which is unprocessed, that is, for which an expected amount (power consumption) and an expected app profit are not calculated remains (S52). When the unprocessed app type remains (S52: NO), the flow returns to step S49. When the unprocessed app type does not remain (S52: YES), the DC and app type selection program 232 adds information on the user input and the plan result for the current plan to the DC and app type selection processing record table 243, and ends the flow of this processing.

Next, an example of a user interface screen for the virtual zero emission computing operator 11 to acquire an IT infrastructure construction plan (plans of a data center group and an app type group) of the virtual zero emission computing service from the virtual zero emission computing planning server 110 will be described.

FIG. 21 shows an example of a request input screen 510 for the initial plan. A display device of the virtual zero emission computing operator terminal 101 displays the request input screen 510 according to the information received from the virtual zero emission computing planning server 110. An instruction from the virtual zero emission computing operator 11 is provided to the virtual zero emission computing operator terminal 101 via the input device.

The request input screen 510 shows an app type candidate list 511 and a data center installation location candidate list 512. The app type candidate list 511 shows information on each app type in the app type table 242. The data center installation location candidate list 512 shows information on each data center installation location candidate in the DC installation location candidate table 241. The virtual zero emission computing operator 11 can obtain, by referring to these pieces of information, information on the app type and the data center that can be included in the plan.

The parameter input section 513 receives, from the virtual zero emission computing operator 11, an input of a request value for a data center to be constructed. Specifically, the minimum renewable energy supply amount used by the data center and the cost upper limit (maximum investment amount) of the data center group are designated. Only one of the parameters may be designated, or the other parameter may be designated. When a plan creation button 514 is selected, the input parameters are transmitted to the virtual zero emission computing planning server 110. As described above, the data center (installation location) group and the app type group included in the plan are determined based on these values.

FIG. 22 shows an example of a planning result display screen 530 of the initial plan. The display device of the virtual zero emission computing operator terminal 101 presents the planning result display screen 530 to the virtual zero emission computing operator 11. Accordingly, the virtual zero emission computing operator 11 can check a content of the proposed plan. A part of the information shown in FIG. 22 may be omitted, and other information not shown in FIG. 22 may be presented.

The planning result display screen 530 shows a list 531 of the selected data centers, a total investment amount 532 to data center groups, and a total amount 533 of a renewable energy supply amount of a data center group. These values can be acquired from, for example, the DC and app type selection processing record table 243, the DC and app type selection processing in-progress information table 244, and the selected DC installation location and IT equipment capacity table 247. The planning result display screen 530 further shows a list 534 of the selected app types and an expected app profit 535. These values can be acquired from, for example, the DC and app type selection processing record table 243 and the selected app type and expected amount table 248.

The invention is not limited to the above embodiments, and includes various modifications. For example, the above embodiments have been described in detail to facilitate understanding of the invention, and the invention is not necessarily limited to those including all the configurations described above. A part of a configuration of an embodiment can be replaced with a configuration of another embodiment, and a configuration of another embodiment can be added to a configuration of an embodiment. A part of a configuration of each embodiment can be added to, deleted from, or replaced with another configuration.

Each of the above configurations, functions, processing units, or the like may be partially or entirely implemented by hardware such as design using an integrated circuit. Each of the above configurations, functions, and the like may be implemented by software when a processor interprets and executes a program for implementing each function. Information of programs, tables, files, or the like for implementing each function can be placed in a recording device such as a memory, a hard disk, and a solid state drive (SSD), or a recording medium such as an IC card and an SD card.

Control lines and information lines show those considered to be necessary for the description, and not all the control lines and the information lines are necessarily shown on the product. Actually, it may be considered that almost all the configurations are connected to each other.

What is claimed is:

1. A data center management system comprising:

a processor; and a data storage, wherein the data storage stores data center candidate management information and application program type candidate management information, the data center candidate management information is used for managing information on a plurality of data center candidates, information on each data center candidate of the plurality of data center candidates indicates a characteristic of renewable energy supplied to each data center candidate, the application program type candidate management information is used for managing information on a plurality of application program type candidates, and application program type candidate management information comprise: (i) information on each application program type candidate of the plurality of application program type candidates indicates a characteristic of each application program type candidate; and (ii) a level of flexibility of power consumption amount control performed by each application program type candidate, and the processor:

receives renewable energy supply data for each data center candidate, determines, with reference to the data center candidate management information and the application program type candidate management information, a plurality of combinations each including one or more data center candidates and one or more application program type candidates, determines, for each combination, a matching degree between a fluctuation characteristic of the renewable energy supplied to each data center candidate and the level of flexibility of power consumption amount control of each application program type candid ate, calculates a total score for each combination by applying a matching degree coefficient, wherein the matching degree coefficient is determined from a matching degree coefficient table that defines coefficients based on combinations of (i) a fluctuation level of the application program type candidate, (ii) a control flexibility level of the application program type candidate, and (iii) a fluctuation level of renewable energy at the data center candidate, based on a correlation between the level of flexibility of power consumption amount control of each application program type candidate and a level of fluctuation in the characteristic of renewable energy supplied to each data center candidate, automatically selects a combination of the plurality of combinations having a highest total score for deployment, performs app workload scheduling by determining an execution data center from the selected combination and an execution time of the application workload based on a data center and a time zone in which a renewable energy supply amount is at least an identified amount, deploys the application workload to the execution data center as a determined deployment destination, and executes, by a server of the execution data center, the deployed application workload, and returns an execution result of the deployed application workload to a management server.

2. The data center management system according to claim 1, wherein a condition for selecting the combination by the processor is that renewable energy supplied to the one or more data center candidates is equal to or greater than a threshold designated by a user.

3. The data center management system according to claim 1, wherein the information on each application program type candidate of the plurality of application program type candidates includes information on a profit of the application program type candidate, the processor determines a predicted profit value of the combination to be presented based on the information on the profit, and information on a renewable energy supply amount of one or more data center candidates of the combination to be presented and the predicted profit value are included in information on the combination to be presented.

4. The data center management system according to claim 1, wherein the information on each data center candidate of the plurality of data center candidates indicates information on performance of each data center candidate, the information on each application program type candidate of the plurality of application program type candidates indicates information on requested performance of each application program type candidate, and the processor determines the score based on the information on the performance of the data center candidate and the information on the requested performance of the application program type candidate.

5. The data center management system according to claim 1, wherein the information on each data center candidate of the plurality of data center candidates indicates priority of each data center candidate, and the processor determines the score based on the priority.

6. The data center management system according to claim 1, wherein the processor determines the score based on a relation between ranges of power generation sources configured to supply renewable energy to each of the one or more data center candidates.

7. The data center management system according to claim 1, wherein the processor calculates an IT equipment capacity for each data center candidate of the selected combination based on a maximum value of a renewable energy amount and an assumed power usage efficiency (PUE) value of the data center candidate.

8. The data center management system according to claim 1, wherein the processor determines an execution time for the application workload based on a predicted renewable energy supply amount per hour indicated by a renewable energy amount prediction table.

9. The data center management system according to claim 1, wherein the processor calculates an expected power consumption for each application program type candidate based on an IT equipment capacity of a corresponding data center candidate and an app power consumption ratio of the application program type candidate.

10. The data center management system according to claim 1, wherein the processor calculates an expected application profit based on an expected power consumption, an expected number of application users per power consumption, and a user unit price.

11. The data center management system according to claim 1, wherein the data center candidate management information includes a coverage range indicating a range of a renewable energy power generation source that supplies power to each data center candidate.

12. The data center management system according to claim 1, wherein the processor applies a coefficient to the total score based on whether renewable energy power generation source ranges of two or more data center candidates in a combination overlap.

13. The data center management system according to claim 1, wherein the matching degree is calculated by multiplying the matching degree coefficient by a renewable energy amount of the data center candidate divided by a total renewable energy amount of all data center candidates in the combination.

14. The data center management system according to claim 1, wherein the processor stores, in a selected DC installation location and IT equipment capacity table, information on the selected combination including a data center ID, an update date and time, a state indicating whether the data center is selected, being installed, being operated, or decommissioned, and an IT equipment capacity value.

15. The data center management system according to claim 1, wherein the processor calculates an individual score for each combination of one data center candidate and one application program type candidate, and calculates the total score for each combination of the plurality of combinations based on a sum of the individual scores.

16. The data center management system according to claim 1, wherein the data center candidate management information includes capability information indicating performance of each data center candidate, the application program type candidate management information includes capability requirement information indicating performance required by each application program type candidate, and the processor applies a first coefficient to the score when the cap ability information matches the capability requirement information and applies a second coefficient smaller than the first coefficient when the capability information does not match the capability requirement information.

17. The data center management system according to claim 1, wherein the application program type candidate management information includes a fluctuation level indicating a level of fluctuation in a power consumption amount of each application program type candidate and a control flexibility level indicating a level of flexibility with which an execution location and an execution time of each application program type candidate can be controlled.

18. The data center management system according to claim 1, wherein the data center candidate management information includes form information indicating whether each data center candidate is a container type or a normal type and indicating a scale of each data center candidate.

19. A method for managing a data center by a system, the method comprising:

by the system, storing data center candidate management information and application program type candidate management information;

the data center candidate management information being used for managing information on a plurality of data center candidates, information on each data center candidate of the plurality of data center candidates indicating a characteristic of renewable energy supplied to each data center candidate, the application program type candidate management information being used for managing information on a plurality of application program type candidates, and application program type candidate management information comprise: (i) information on each application program type candidate of the plurality of application program type candidates indicating a characteristic of each application program type candidate; and (ii) a level of flexibility of power consumption amount control performed by each application program type candidate, receiving renewable energy supply data for each data center candidate, determining, with reference to the data center candidate management information and the application program type candidate management information, a plurality of combinations each including one or more data center candidates and one or more application program type candidates;

determining, for each combination, a matching degree between a fluctuation characteristic of the renewable energy supplied to each data center candidate and the level of flexibility of power consumption amount control of each application program type candidate, calculating a total score for each combination by applying a matching degree coefficient, wherein the matching degree coefficient is determined from a matching degree coefficient table that defines coefficients based on combinations of (i) a fluctuation level of the application program type candidate, (ii) a control flexibility level of the application program type candidate, and (iii) a fluctuation level of renewable energy at the data center candidate, based on a correlation between the level of flexibility of power consumption amount control of each application program type candidate and a level of fluctuation in the characteristic of renewable energy supplied to each data center candidate, automatically selecting a combination of the plurality of combinations having a highest total score for deployment, performing app workload scheduling by determining an execution data center from the selected combination and an execution time of the application workload based on a data center and a time zone in which a renewable energy supply amount is at least an identified amount, deploying the application workload to the execution data center as a determined deployment destination, and executing, by a server of the execution data center, the deployed application workload, and returning an execution result of the deployed application workload to a management server.

* * * * *